United States Patent

[11] 3,580,978

[72] Inventor  William C. Ebeling
              Binghamton, N.Y.
[21] Appl. No. 735,109
[22] Filed     June 6, 1968
[45] Patented  May 25, 1971
[73] Assignee  Singer-General Precision, Inc.
              Binghamton, N.Y.

[54] VISUAL DISPLAY METHOD AND APPARATUS
     46 Claims, 26 Drawing Figs.
[52] U.S. Cl. ................................................ 35/10.2,
                35/12N, 35/12S, 178/6.8, 353/11, 353/30
[51] Int. Cl. ........................................... G09b 9/02,
                                                         G06g 7/72
[50] Field of Search .......................................... 35/10.2,
                                                10.4, 12 N; 178/6.8

[56]              References Cited
              UNITED STATES PATENTS
2,883,763   4/1959   Schaper ...................... 35/12
2,999,322   9/1961   Hemstreet .................... 35/12
3,076,271   2/1963   Marvin et al. ................. 35/12
3,101,645   8/1963   Hemstreet .................... 35/12X
3,233,508   2/1966   Hemstreet .................... 35/12X
3,261,912   7/1966   Hemstreet .................... 35/12X
3,284,923  11/1966   Leslie ......................... 35/8
3,367,046   2/1968   Neuberger .................... 35/12
3,439,105   4/1969   Ebeling et al. ................ 35/10.2
3,451,144   6/1969   Chao et al. ................... 35/10.2

FOREIGN PATENTS
751,628   7/1956   Great Britain ............... 35/12
896,404   5/1962   Great Britain ............... 35/12
1,037,060 7/1966   Great Britain ............... 35/12

Primary Examiner—Malcolm A. Morrison
Assistant Examiner—Felix D. Gruber
Attorneys—Francis L. Masselle, William Grobman and
Andrew G. Pullos ABSTRACT: Apparatus for generating a realistic wide-screen visual display for an aircraft simulator with realistic perspective throughout plural widely different phases of simulated flight by scanning a plurality of different successive types of transparencies with a flying spot scanner to derive video signals to drive television display projectors, including the scanning of a pair of transparencies to provide a background terrain elevation image without topographical features, scanning of a second type of transparency to provide an image of an airport or the like to be inset into the background image and distorting the inset image as simulated range and elevation angle from the airport vary, scanning a third type of transparency to provide a different type of inset image during simulated approach and landing and distorting that inset image in accordance with deviation of the simulated aircraft from a reference glideslope, and scanning a fourth type of transparency to provide a panoramic view of the airport during simulated taxiing and parking maneuvers, with means for automatically controlling the successive scanning modes with signals from a flight computer.

Patented May 25, 1971
3,580,978
12 Sheets-Sheet 1
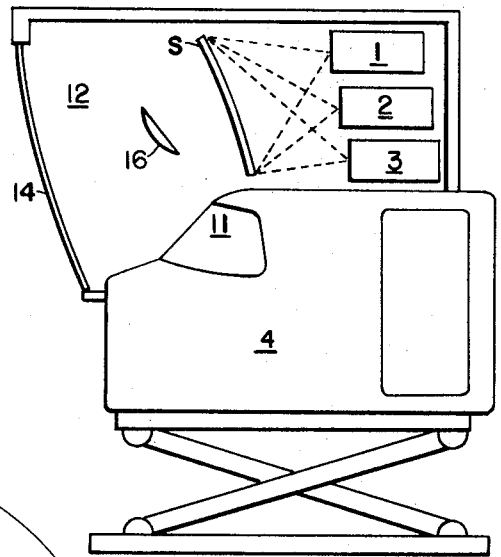
FIG.1
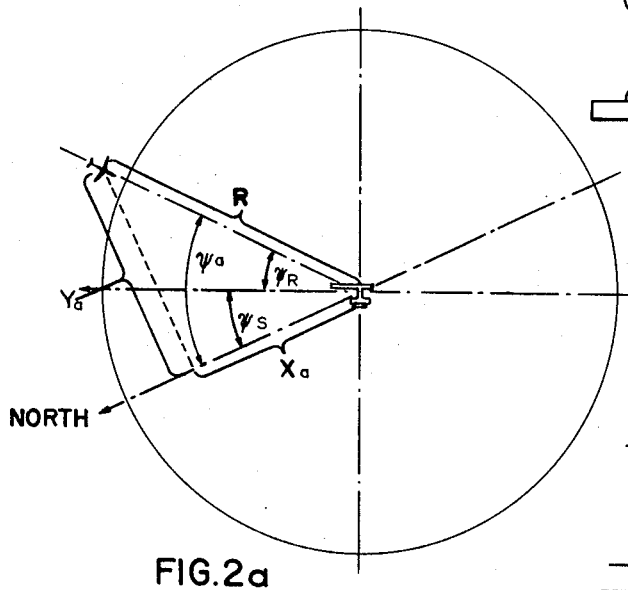
FIG.2a
FIG.2b
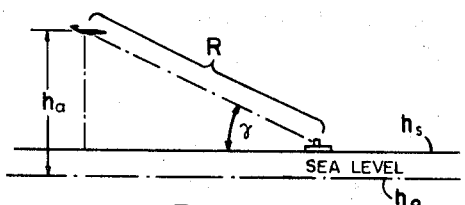
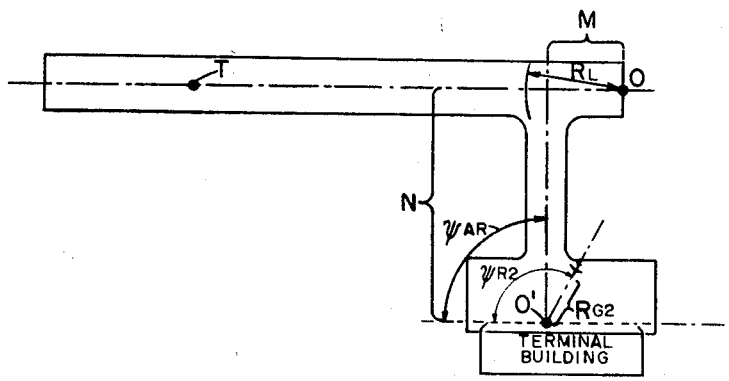
FIG.2c
WILLIAM C. EBELING
INVENTOR
BY
HIS ATTORNEY

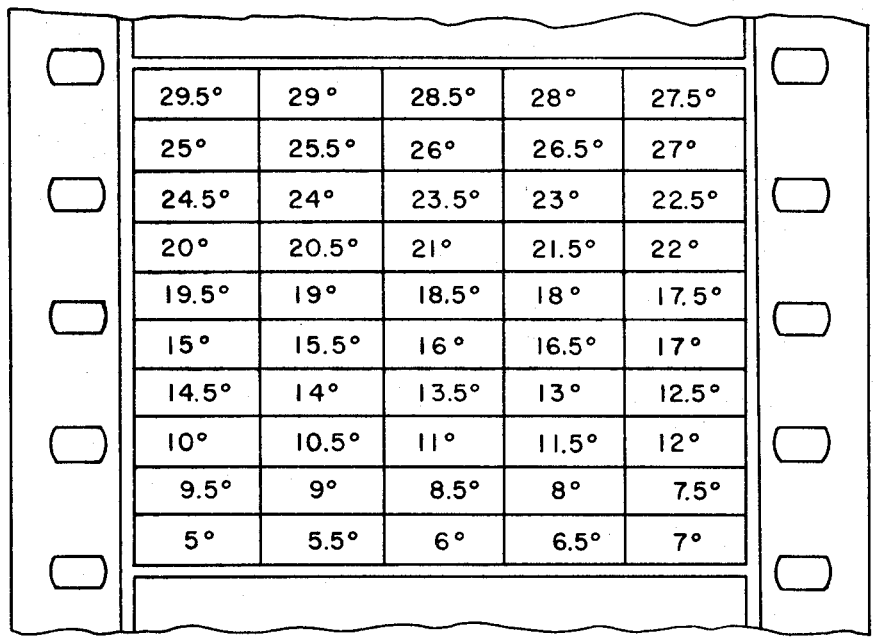
FIG. 3
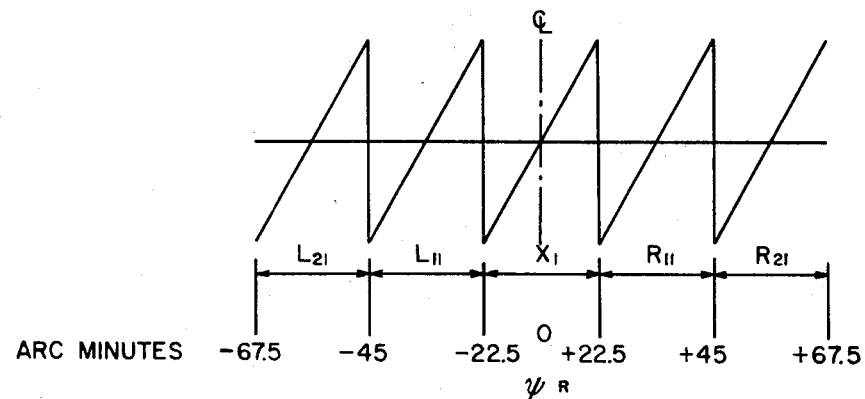
ARC MINUTES  −67.5  −45  −22.5  0  +22.5  +45  +67.5
FIG. 4a
| | | $U_{21}$ | | |
|---|---|---|---|---|
| | $L_{11}U_1$ | $U_{11}$ | $R_{11}U_1$ | |
| $L_{21}$ | $L_{11}$ | $X_1$ | $R_{11}$ | $R_{21}$ |
| | | $D_{11}$ | | |
| | | $D_{21}$ | | |
FIG. 4
WILLIAM C. EBELING
INVENTOR
BY 
HIS ATTORNEY Patented May 25, 1971

WILLIAM C. EBELING
INVENTOR

BY

HIS ATTORNEY

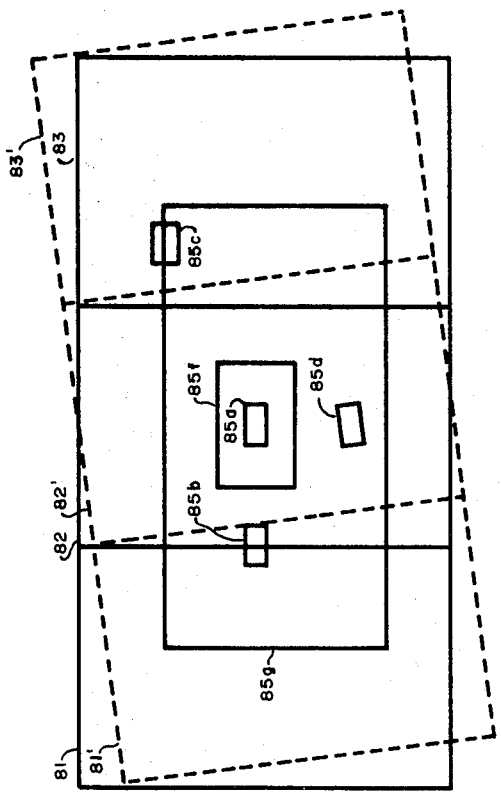
FIG.11
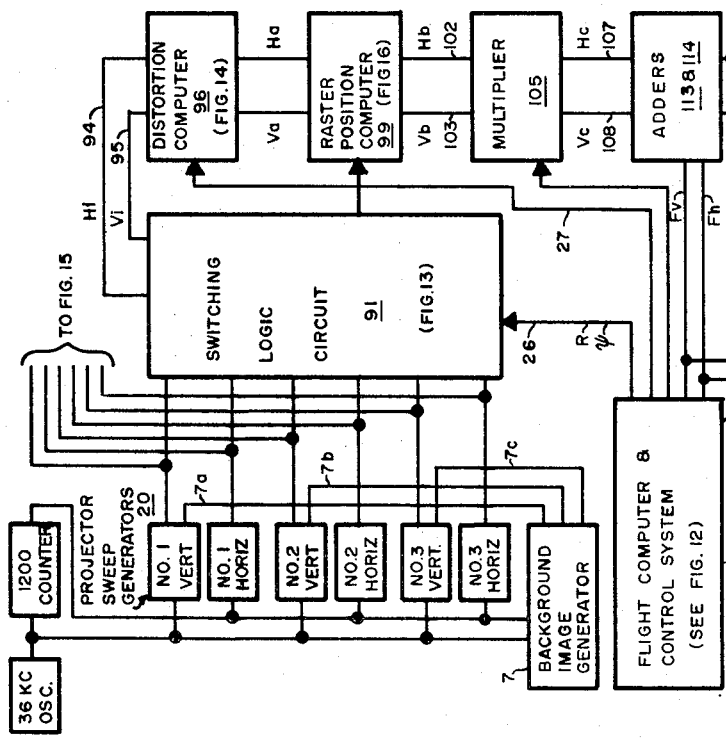
FIG.7
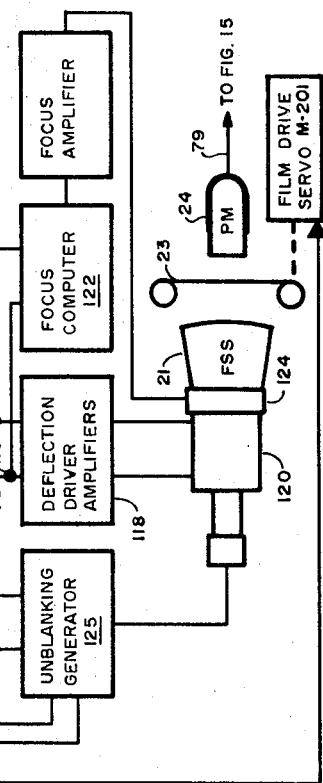
WILLIAM C. EBELING
INVENTOR
BY *Andrew G. Puller*
HIS ATTORNEY

WILLIAM C. EBELING
INVENTOR

BY *Andrew N. Pullos*

HIS ATTORNEY

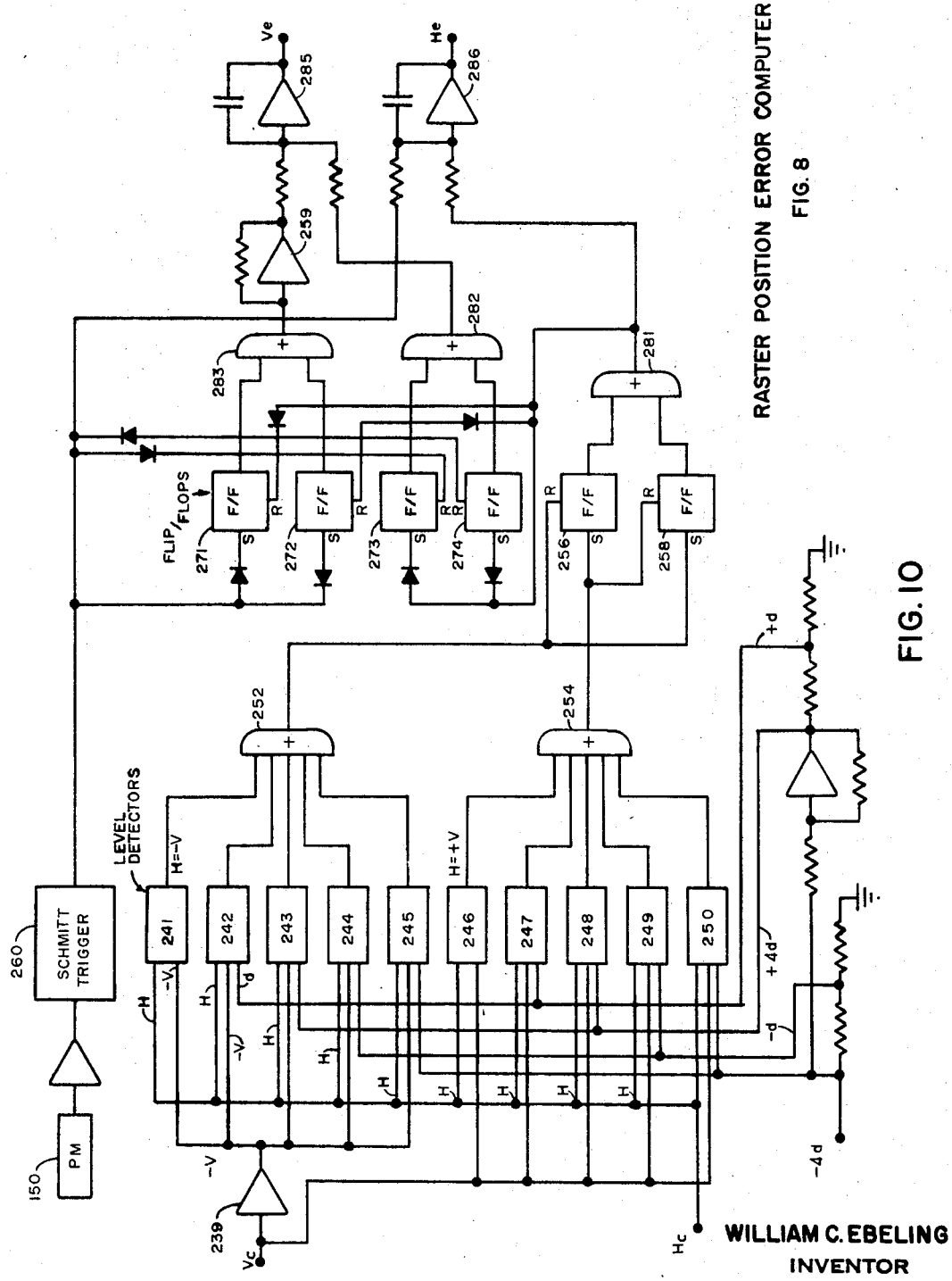

WILLIAM C. EBELING
INVENTOR

BY

HIS ATTORNEY

Patented May 25, 1971　　　3,580,978

WILLIAM C. EBELING
INVENTOR

BY *(signature)*

HIS ATTORNEY

WILLIAM C. EBELING
INVENTOR

HIS ATTORNEY

VISUAL DISPLAY METHOD AND APPARATUS

This invention relates to visual display method and apparatus, and, more particularly, to novel method and apparatus for providing simulated displays which realistically depict scenes as they would be viewed from traveling vehicles, such as aircraft. The invention is particularly useful for the simulation of takeoff, landing and ground-maneuvering of aircraft in connection with training or amusement apparatus.

One prior art visual display system for simulating movement of the observer involves the use of a transparent three-dimensional model of an airport and a point light source, and is typified by DeFlorez et al. U.S. Pat. No. 2,961,778. Such systems are disadvantageous in that such models are extremely expensive to construct, so that simulation is ordinarily limited to flight over very confined areas, and in that it is difficult to provide adequate brightness in point light source systems. Also, such systems are unrealistic in that objects depicted in such systems appear to become more blurred as they are approached, a phenomenon usually quite opposite to that of the real world.

A second type of prior art visual display system involves the use of a television camera "flown" with 6° of freedom with respect to a three-dimensional airport model, as typified by U.S. Pat. Nos. 3,012,337 and 2,979,832. Such systems either have used extremely large, bulky and expensive models, or if a small model has been used, they have suffered from focusing problems, due in general to the fact that the viewing lens cannot be reduced in size proportionally. Also, when a large scale factor is used to enable the size of the model to be reduced, vibration of the television camera or its lens system relative to the model results in greatly magnified and unrealistic jerks and jumps in the final visual display provided to the observer.

A third type of prior art visual display system employs flying spot scanner means and two flat transparencies representing the relevant terrain. By controlling the flying spot scanner sweep on one transparency in accordance with simulated motion of the observer, video signals of proper luminance (and color, if desired) to display the relevant terrain are provided. By simultaneously and synchronously sensing elevation data which is density-coded on the second transparency, further signals may be derived and used to process the luminance video signals to provide a final cathode-ray tube presentation having a perspectively corrected scene. Various systems of this type are shown in my copending joint application with Eldred H. Paufve, Ser. No. 442,392, filed Mar. 24, 1965, now U.S. Pat. No. 3,439,105. While systems of this type provide realistic three-dimensional displays of natural terrain, they have been unable to provide similar realism for cultural (man-made) objects, so, for example, a display provided with such a system may realistically show hills and valleys, but the terrain always looks bare, and devoid of buildings or roads or the like. The absence of cultural features is not serious when flight at fairly great altitudes is simulated, but the lack of cultural features renders such displays unsuitably unrealistic for many training applications. The system shown in the above-mentioned copending application also suffers from focusing problems when it is used to depict scenes, such as those needed to simulate landings of an aircraft, when both near and far objects would be visible, so that an extreme depth of focus is required from the system. A primary object of the present invention is to provide a visual display which realistically depicts not only natural terrain, but also cultural objects, with realistic perspective.

A further type of prior art visual display apparatus is marketed under the trademark "VAMP" by General Precision Systems Inc., and is illustrated in a number of patents issued to Harold S. Hemstreet, including U.S. Pat. Nos. 2,999,322 and 2,975,671, for example. Various of the Hemstreet patents disclose the idea of providing a motion picture filmstrip of a scene as it would appear in normal flight along a reference path, and of projecting the film as a flight simulator "flies" along an approximation of that path, and simultaneously "distorting" or "reshaping" the projected picture in accordance with the displacement between the viewpoint from which each frame was taken along the reference path and the simulated position along the simulated flight path at the instant when a given frame is projected. While such systems are extremely realistic for some flight patterns, and generally quite satisfactory for simulation of very many approaches, landings, and takeoffs, they become unrealistic if a given simulated path departs too much from the reference path along which the film was taken, so that an extreme amount of "distortion" has to be applied to the projected images. Under such conditions, the actual vertical edges of three-dimensional objects such as trees and houses in the projected scene noticeably appear to lean away from the vertical.

A more serious objection to the use of the "VAMP" systems for some training purposes, is the fact that the path of travel is substantially "preprogrammed," or fixedly predetermined. The Hemstreet systems, in allowing flight path variations over a range of several degrees, were, so far as I know, the first visual display systems using motion picture films as the basic storage medium which did not need to be *completely* preprogrammed. However, it is highly advantageous in many training applications that the display be even much less programmed, so that realistic simulation can be provided, not only throughout the envelope of a standard ILS system, but over a much wider area. The prior invention of the mentioned Ebeling-Paufve application has the advantage over the Hemstreet system that simulated flight, though it must be at high simulated altitudes, may be completely unprogrammed over an area of many square miles and still be quite realistic, although the Hemstreet systems are much preferred for landing and takeoff simulation.

The present invention borrows several features of the Hemstreet systems, several features of the Ebeling-Paufve system shown in the copending application, and combines them with a number of new features to provide a realistic display which is usable over practically all flight regimes, from taxiing out to a runway, through takeoff, flight at both high and low altitudes, approach, landing and taxiing up to an unloading ramp. In accordance with the present invention, the basic Ebeling-Paufve system is used at altitudes above a selected level, so that jet flights along any route to any place may be simulated, and an auxiliary system is used to inset features to provide more detail in portions of the display when simulated altitude decreases to a point where cultural objects should be noticeable. The basic Ebeling-Paufve system includes a cathode-ray tube in its output display system, and hence the function of the auxiliary equipment is to provide video signals representing the picture content to be inset, in order that such video signals may be switched to the cathode-ray tube display system at appropriate times. The substitute video signal used in the present invention may be derived from scanning film frame transparencies which represent scenes viewed along a reference path (or from points on a related group of reference paths), with the signals "distorted" in accordance with Hemstreet's teachings, to account for the difference between the location of the simulated viewpoint of the student pilot at the instant when a given film frame is "projected" (i.e. scanned and used to provide the video signals for the picture inset), and the location at which the camera was situated during the instant when the given film frame was taken.

As mentioned above, one problem which has discouraged more widespread use of the Hemstreet systems has been the fact that distortion has had to be limited to only a few degrees to avoid an unrealistic "leaning" of trees and buildings and the like. The idea of providing many film strips taken at many different approach angles, and of automatically selecting from among them in accordance with instantaneous simulated pilot-viewpoint location, so that much less distortion need be applied to any one filmstrip to allow simulated approaches from a given range of angles, has not been deemed suitable for use with the Hemstreet systems, as it apparently would require either a large number of synchronized projectors for a number of filmstrips or an extremely expensive and perhaps impossible mechanical means for very rapidly substituting frames from a number of different filmstrips into a single or a few projectors. If motion picture film is projected with a substantially conventional projector, in the manner suggested by Hemstreet, it is either extremely difficult mechanically or extremely expensive to provide a film feed device which can substitute frames from different strips with sufficient rapidity to avoid disconcerting flicker as the simulated approach angles vary. In the present invention, however, because film frames are scanned by a flying spot scanner, the electron beam of which can be indexed extremely rapidly and easily, it becomes practical to select at various instants between pictures representing a large plurality of reference paths covering different approach angles, so that viewpoint displacement over a wide area can be accommodated in large measure by filmstrip selection, and only a small residual viewpoint displacement error need be removed by distortion of the images of the selected film pictures. Thus, it is another object of the invention to provide improved visual display method and apparatus in which picture information is provided by selection of pictures from various sequences of frames (filmstrips) showing the same area as viewed from different positions. It is a further object of the invention to provide such a visual display in which the picture information from those frames selected from various frame sequences is also distorted in order to simulate viewpoint displacement.

Other objects of the invention will in part be obvious and will in part appear hereinafter.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

For a fuller understanding of the nature and objects of the invention reference should be had to the following detailed description taken in connection with the accompanying drawings, in which:

FIG. 1 is a perspective view of an aircraft flight simulator incorporating one form of the invention;

FIG. 2a is a geometric plan-view map of an airport useful in explaining the operation of the invention during simulation of flight at considerable distances from the airport;

FIG. 2b is an elevation diagram of FIG. 2a;

FIG. 2c is a plan view of an airport runway and terminal building useful in describing operation of the invention to simulate travel of an aircraft near a simulated airport terminal;

FIG. 3 illustrates one frame of 70 mm. film provided with a matrix of 50 pictures of a simulated airport and surrounding terrain, of which all 50 were taken facing toward the airport from positions located in the same azimuthal direction and at the same distance from the airport, but at 50 different elevation angles;

Figure 2:
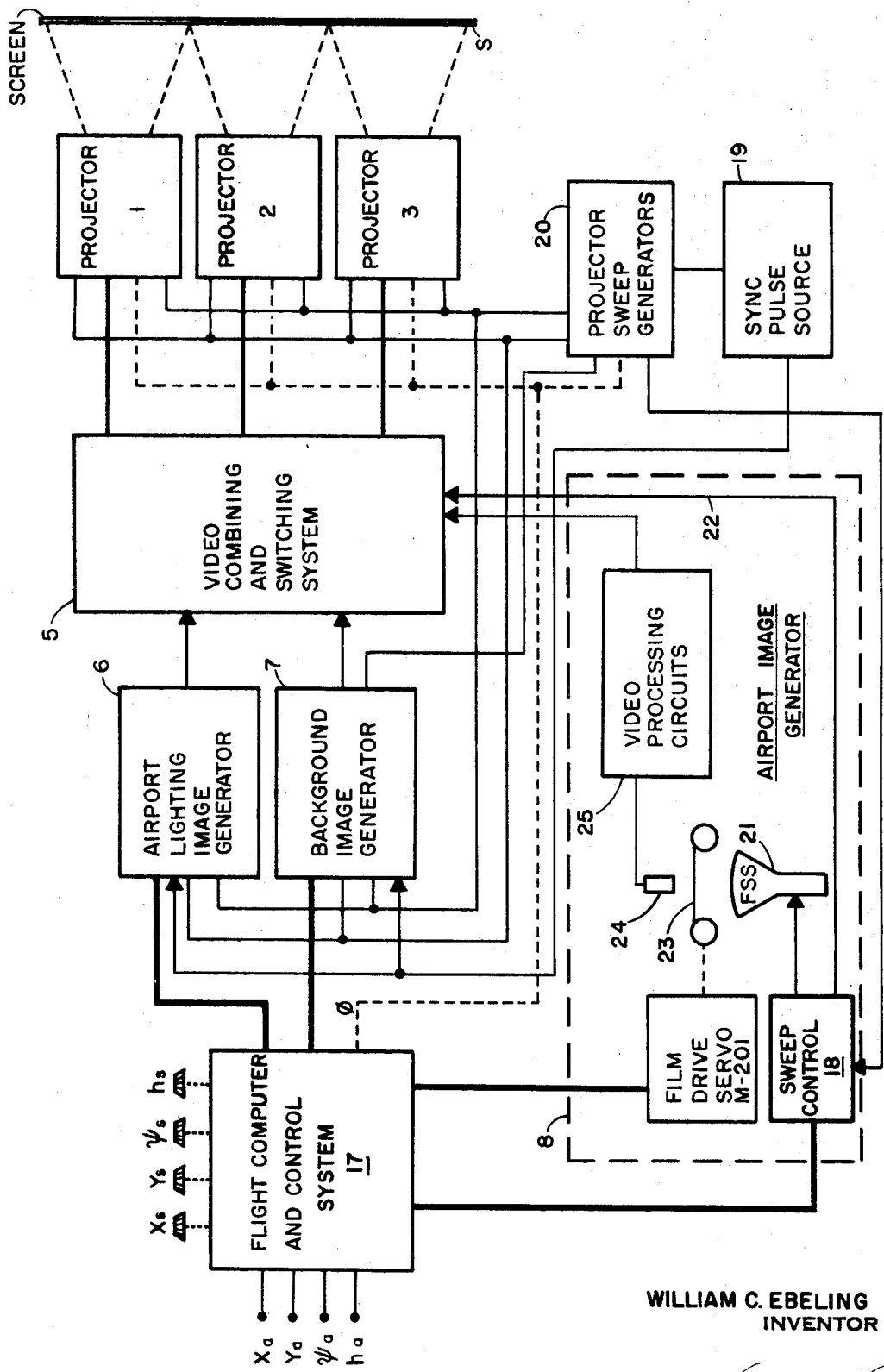
FIG. 2 is a block diagram of the overall visual display apparatus included with the simulator of FIG. 1.
Figure 5:
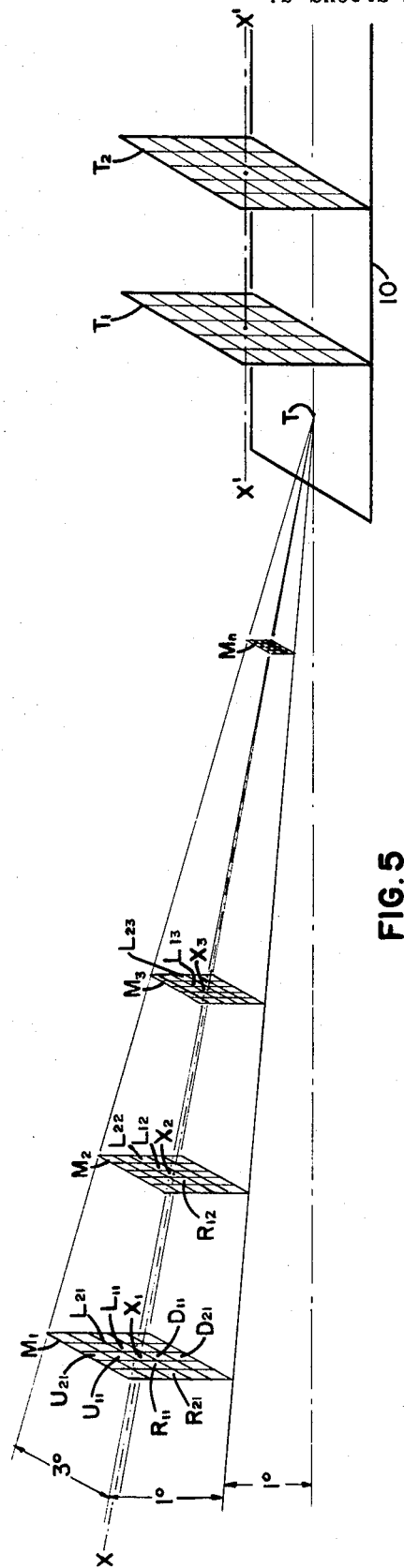
Figure 6:
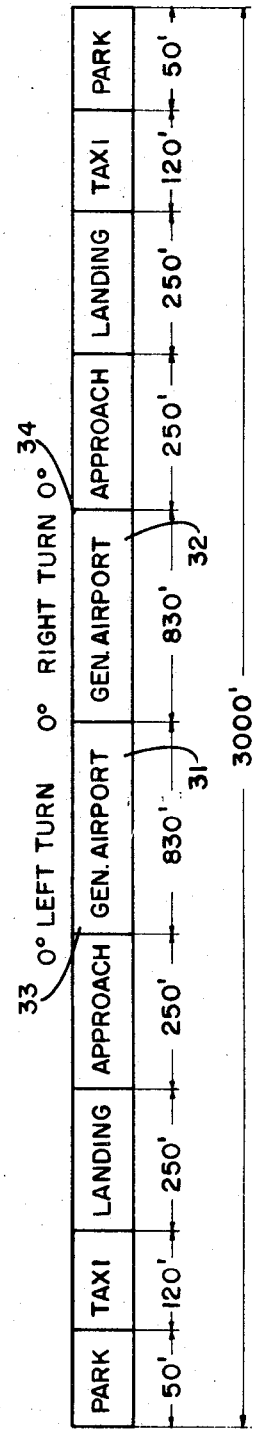
Figure 8:
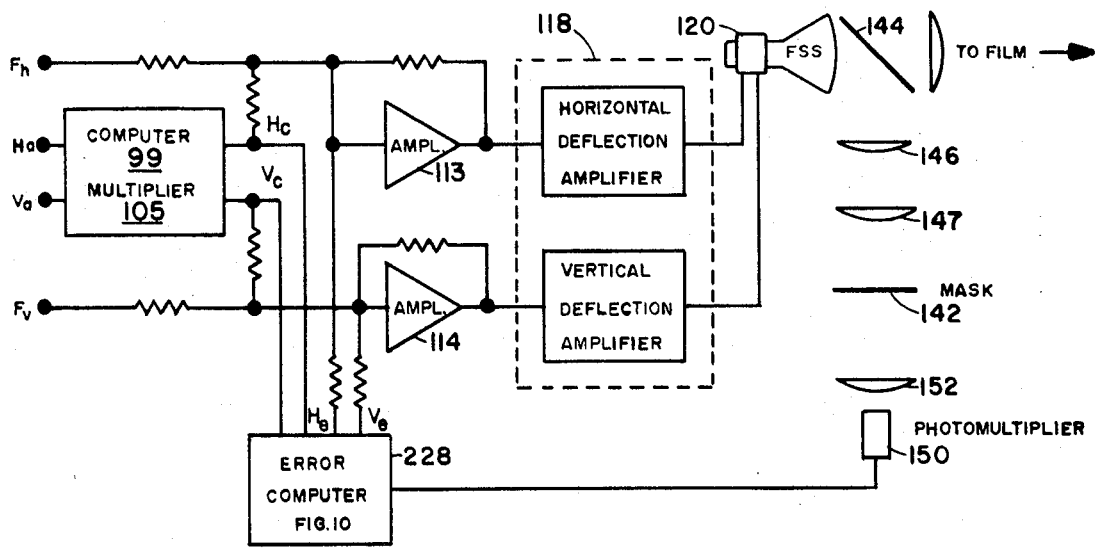
Figure 9:
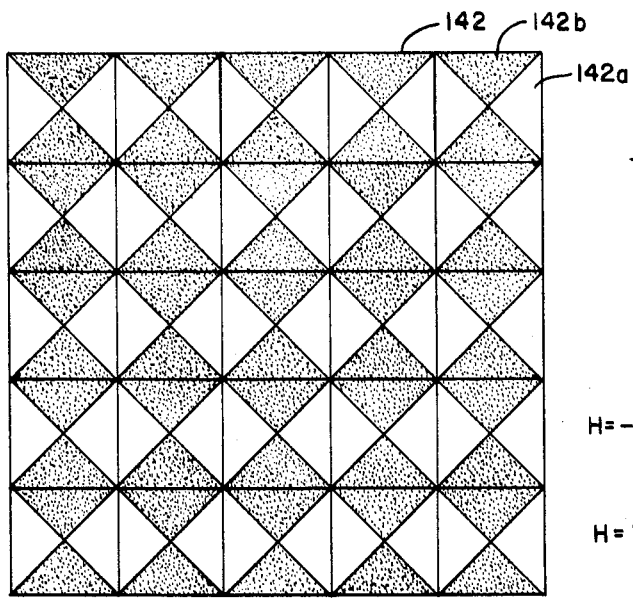
Figure 9A:
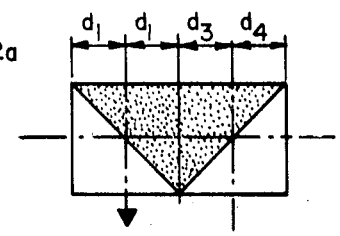
Figure 9B:
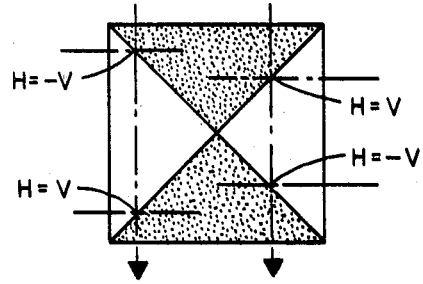
Figure 9C:
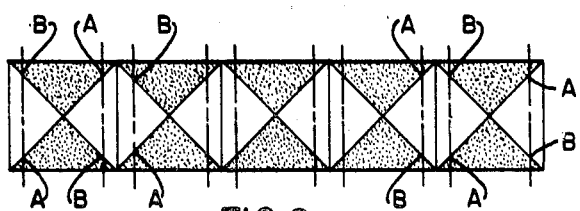
Figure 12:
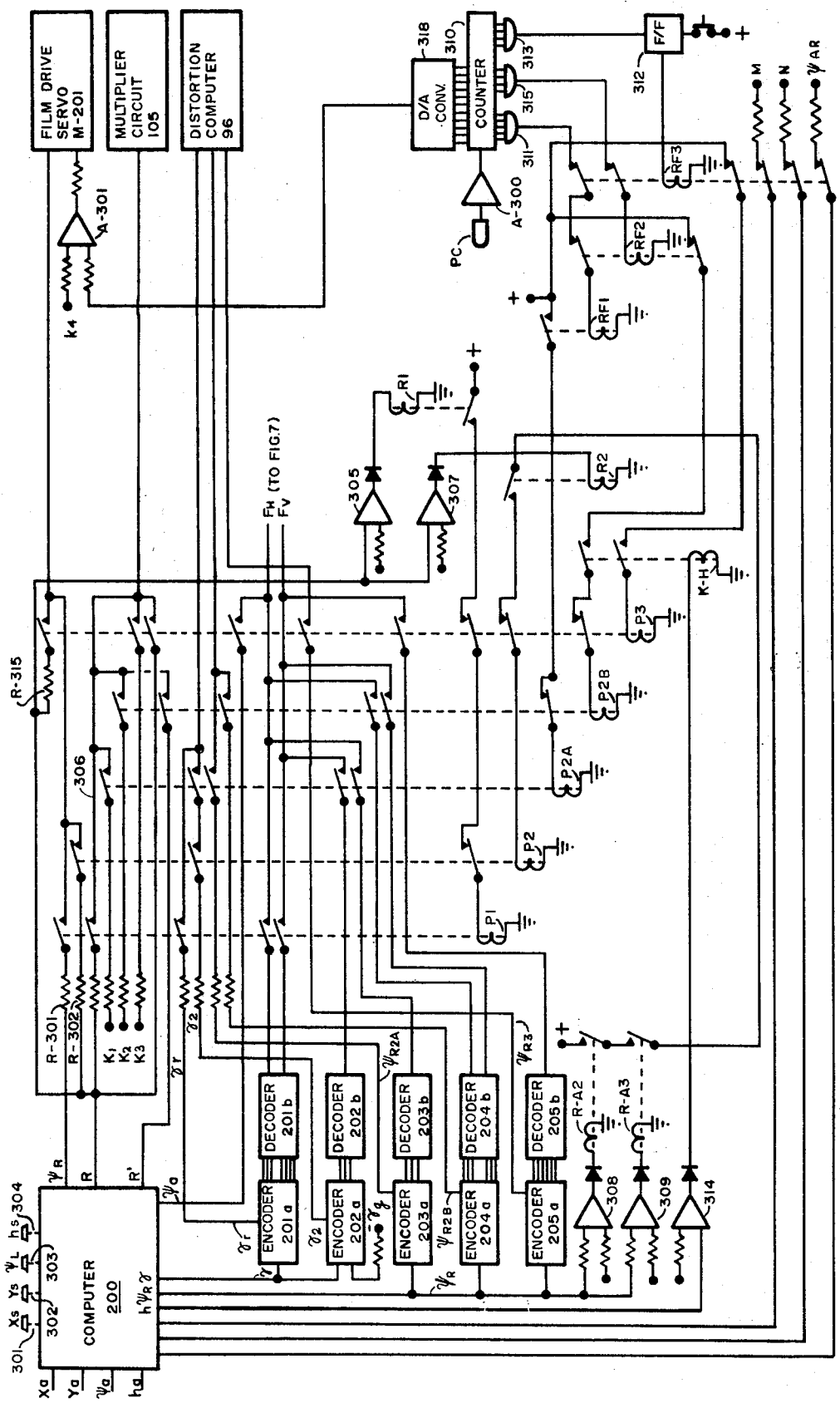
Figure 13:
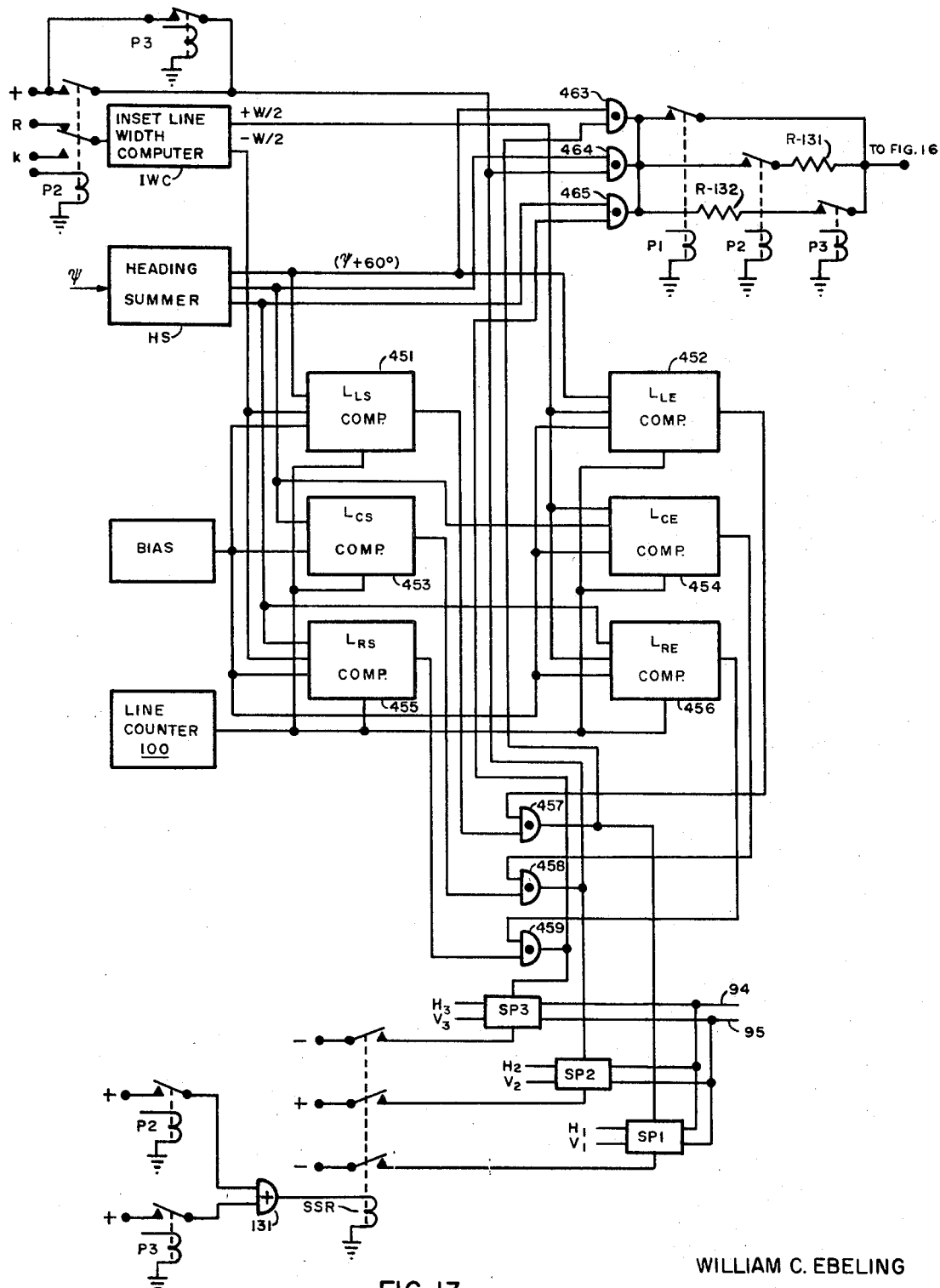
Figure 13A:
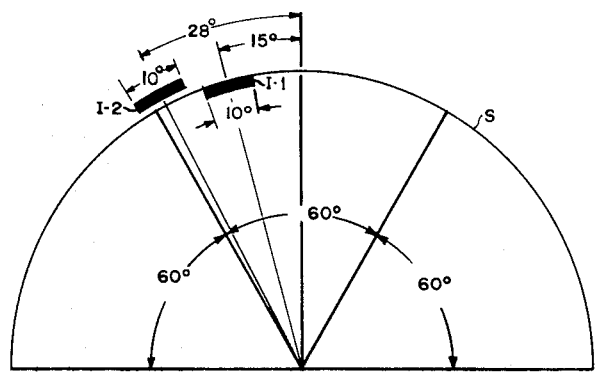
Figure 13B:
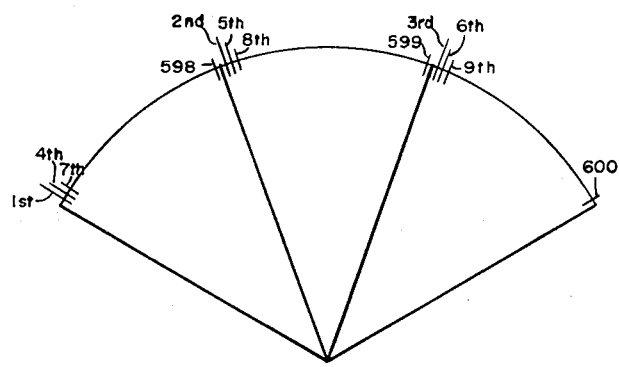
Figure 13C:
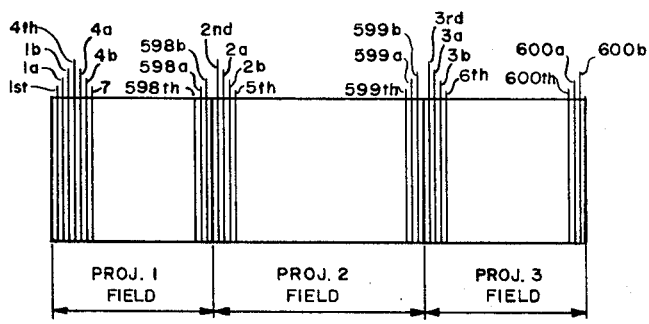
Figure 14:
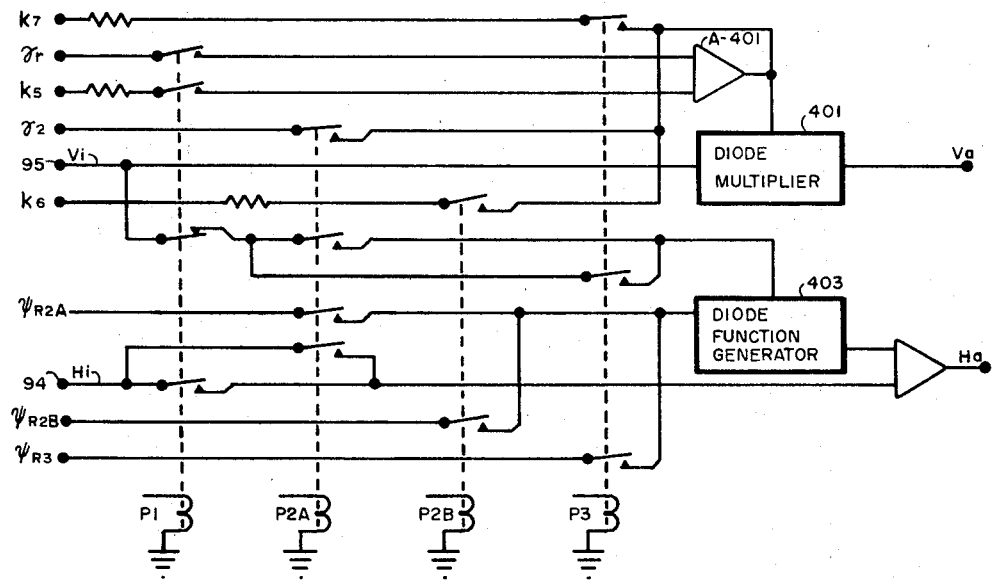
Figure 16:
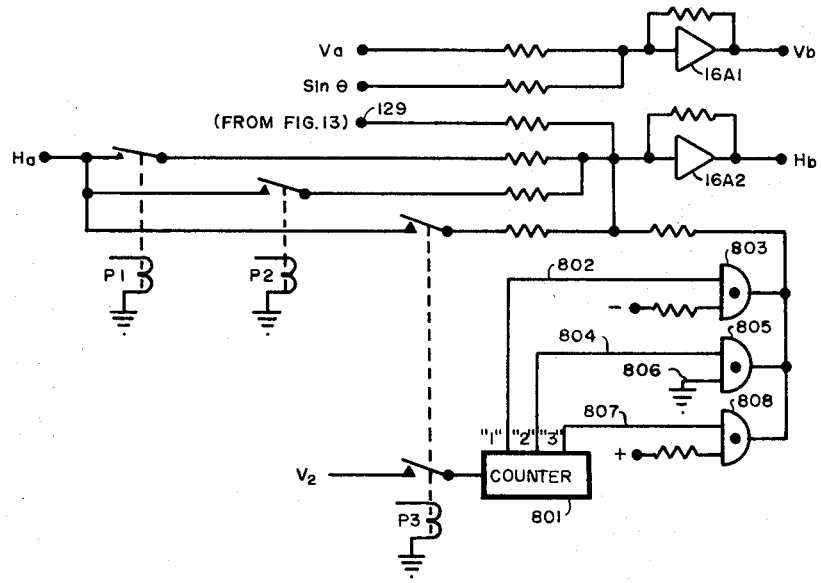
Figure 15:
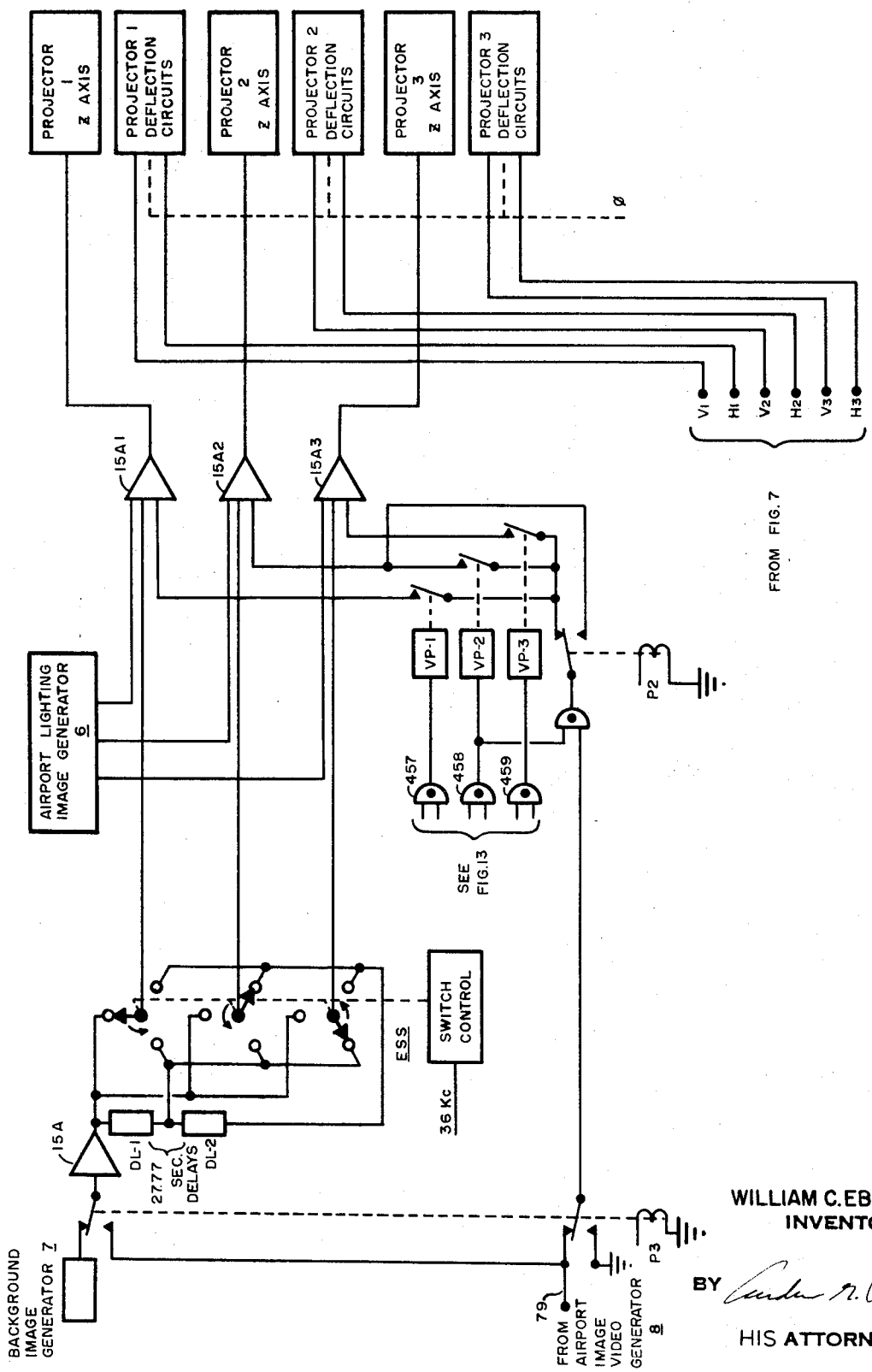

FIG. 4 is a diagram illustrating one frame of 70 mm. film provided with a matrix of 25 pictures of the airport all taken from the same distance from the runway touchdown point, with the central pictures taken down the center of the ILS glideslope, and with the surrounding pictures taken at slightly varying azimuths and elevations from the glideslope. FIG. 4a is a graph illustrating the amount by which the pictures in a film frame such as that of FIG. 4 are distorted as the simulated aircraft deviates laterally from the centerline of the simulated glideslope;

FIG. 5 is a diagrammatic view of a glideslope and runway showing a plurality of photograph matrices of the type illustrated in FIG. 4 spaced relative to the glideslope and along the runway to indicate the viewpoints from which the various photographs of such photomatrices are taken;

FIG. 6 is a diagram illustrating how a plurality of filmstrips comprised of frames or photograph matrices, including the types shown in FIGS. 3 and 4, may be spliced together to allow continuous visual simulation throughout a plurality of different operating modes;

FIG. 7 is a block diagram of the flying spot scanner sweep control system of the airport image generator, together with certain portions of the overall visual display apparatus illustrated in FIG. 2;

FIG. 8 is a block diagram of the feedback raster centering system utilized with the flying spot scanner of the airport image generator to insure proper registration of the scanner raster with the photographs which it scans, together with certain details of the flying spot scanner sweep control system of FIG. 7;

FIG. 9 is a diagrammatic view of a centering mask used with the raster centering system of FIG. 8;

FIGS. 9a, 9b and 9c illustrate portions of the centering mask which are used during different phases of a mission;

FIG. 10 is a block diagram of the raster position error computer portion of the raster centering system illustrated in FIG. 8;

FIG. 11 is a diagram illustrating a general airport image inset at various locations into the background display which is useful in explaining operation of the switching logic circuit illustrated in FIGS. 7, 13 and 15;

FIG. 12 is a schematic diagram of the control system illustrated in block diagram form in FIG. 2, which automatically switch as the operation of the airport image generator through successive phases of the mission and which provides certain computed quantities to control the flying spot scanner of the airport image generator;

FIG. 13 illustrates portions of the switching logic circuit illustrated in FIG. 7;

FIGS. 13a, 13b and 13c are geometric diagrams useful in explaining the operation of the switching logic system of FIG. 13;

FIG. 14 is a simplified schematic diagram of one form of the raster distortion computer illustrated in FIG. 7;

FIG. 15 is a schematic diagram of a portion of the switching logic circuit illustrated in FIG. 7 and the video combining and switching system illustrated in FIG. 2 in which video signals from the airport image generator may be combined with those from a background image generator to control the intensity grids of the television projectors; and FIG. 16 is a schematic diagram of the raster position computer illustrated in FIG. 7 which positions the origin of the image generator flying spot scanner relative to the photograph which it scans.

Like reference numerals throughout the various views of the drawings are intended to designate the same or similar structures.

In an aircraft simulator installation shown in FIG. 1 incorporating a preferred embodiment of the invention, a student pilot and student copilot seated within simulator flight deck or cockpit 4 view the display on rear-projection screen S through a windscreen 11 of the cockpit and through a virtual image viewing system indicated generally at 12, which includes an ellipsoidal mirror 14 and an objective lens 16. The particular virtual image system is not an essential feature of the present invention, and various other known "infinity-image" viewing systems may be substituted. The scene provided on rear-projection screen S is provided by three television projectors 1, 2 and 3, each of which covers a 60° horizontal sector of screen S, which is preferably 180° in width. As shown in FIG. 1, screen S and projectors 1—3 are also preferably carried on cockpit 4, to pitch and roll with the cockpit. With screen S fixed relative to the cockpit windows 11, it will be appreciated that changes must be made in the projected display to simulate changes in aircraft heading, pitch angle and bank angle.

As indicated by the general system diagram of FIG. 2, the overall image provided by projectors 1, 2 and 3 is composed, in video combining and insetting apparatus 5, from video signals from (1) a background image generator 7, which may be of the type described in the mentioned Ebeling-Paufve application, (2) an airport lighting image generator 6, if desired, of the general type shown in U.S. Pat. No. 3,081,557 issued to John Mailhot, and (3) the television and film airport display image generator 8 constructed in accordance with the principles of the present invention. Each of the three image generators is connected to be controlled by a plurality of input signals from a simulator flight and navigation computer 17, in accordance with the attitude and position of the simulated aircraft with respect to various reference points and reference directions, and in accordance with simulated weather or visibility conditions. The present invention may be used with conventional simulator flight computers of either the digital or the analog type or various hybrid digital/analog types. Computing apparatus for performing the function of the computer 17 are disclosed in U.S. Pat. No. 2,925,667 and U.S. Pat. No. 3,233,508.

A pulse source 19 provides sync pulses to a plurality of vertical and horizontal projector sweep generators 20 and to the sweep generators (not shown) in the image generators 6 and 7. Outputs of the projector sweep generators 20 are supplied to respective ones of the projectors 1, 2 and 3 and also to the image generators 6 and 7. In addition, outputs of the projector sweep generators 20 are supplied to a sweep control system 18 which supplies horizontal and vertical sweep signals to a flying spot scanner (FSS) 21 which forms a part of the airport image generator 8. In order to properly inset images from the airport image generator 8 onto background images generated by the image generator 7, the sweep control system 18 provides control signals to the video combining and switching system 5 on a line 22. A transparency 23 which contains an image of the airport is controlled positionaly by a film drive servo M-201 which is driven in accordance with signals derived from the flight computer and control system 17. The FSS 21 scans the transparency 23 and video signals are generated by photomultiplier 24 and transmitted through video processing circuits 25 to the video combining and switching system 5.

The flight computer and control system 17 is preconditioned with certain airport position characteristics from an instructor and is responsive to signals from a simulator which are indicative of the apparent position of the simulator and provides outputs in accordance therewith to the image generators 6 and 7, the sweep control system 18 and the film servo drive M-201. In addition, a simulated change in bank angle of the simulator controls the projector sweep generators 20 and the projectors 1, 2 and 3 by means of the mechanical linkage designated θ.

The preferred embodiment of the invention contemplates that simulated flight at simulated high altitudes and a predetermined distances (e.g. 4 miles or more from the airport to be simulated) will provide on screen S solely a background display without cultural features, of the type described in application Ser. No. 442,392, by means of the known form of background image generator 7. When the simulator simulates an actual aircraft approaching to within a distance of perhaps 4 miles from the airport, a "general airport image" showing the airport and some surrounding terrain will be derived by airport display image generator 8 of the present invention and inset into the background display. When first inset into the background display, the general airport image will occupy a very small portion of screen S and barely be visible, but as the simulator simulating an actual aircraft flying nearer to the airport, the general airport image will occupy an increasingly greater portion of screen S. As simulated aircraft attitude varies, the position on screen S of the inset video must vary, so that at various times the inset video will be displayed by any one of the three projectors, and indeed sometimes different portions of it will be projected onto screen S by two different ones of the three projectors. During this phase of flight simulation, which will be referred to as the "general airport image" phase, the general airport image display is produced by scanning one of a large number (e.g. 180,000) of pictures of the airport and surrounding terrain all taken at the same range from the airport but at different azimuths and elevations from the airport. For example, the pictures may be taken one at every 6 minutes of azimuth (i.e., from 3,600 different azimuth positions around the airport) for each of 50 different elevation increments, all at a range of several miles from the airport, to provide a total of 180,000 pictures. The 50 different pictures all taken at a given azimuthal position preferably are mounted together in a matrix (rows and columns) to form one "frame" of the strip 23 of 70 mm. film, one exemplary frame of such a filmstrip being shown in FIG. 3. As the simulator simulates an actual aircraft flying nearer to the airport, the size of the scanning raster on one of the 180,000 pictures being scanned at the time is decreased to increase the size of the airport image being inset into the background display, and as the simulator simulates an actual aircraft successively reaching different azimuthal and elevation angles relative to the airport, appropriate different ones of the 180,000 pictures are automatically and successively selected and scanned to provide the video signals which are inset into the background display. If 50 pictures taken at a given azimuth are included in each frame of a 70 mm. film, a film strip of approximately 830 feet is required for the 180,000 pictures.

As the simulator simulates an actual aircraft circling around the airport, the film drive servo M-201, controlled in accordance with the instantaneous bearing of the simulated aircraft from the airport, successively positions appropriate frames of the strip 23 in front of the scanning device 21. If the simulator simulates an actual aircraft approaching the airport at a fixed azimuth and at a fixed elevation angle, a single one of the pictures is increasingly "blown up" in the projected display. Whenever a given one of the pictures is scanned, if the simulator simulates an actual aircraft which varies in elevation from the point where the picture was taken, the FSS scanning raster is "distorted" to provide proper perspective in the scene inset into the background display. If the simulator simulates an actual aircraft which approaches at a fixed azimuth but at successively varying elevation angles relative to the airport, various of the 50 pictures on the single frame corresponding to that azimuth are successively scanned. In FIG. 3 each of the 50 rectangles representing a different picture is shown labeled with the particular elevation angle from which it was taken. It may be noted that the 50 pictures are arranged with increasing elevations running back and forth across the frame in successive rows, so that a change from scanning one photograph to scan another photograph associated with the next higher or next lower elevation angle simplifies control of and requires minimum indexing of the flying spot scanner 21 by the sweep control system 18.

When the simulator simulates an actual aircraft which reaches a predetermined approach position within a predetermined distance from the airport and within a predetermined approach "window," which may comprise, for example, the azimuth and altitude positions in which ILS signals may be received, and while the simulator simulating an actual aircraft which flies down the ILS beam, touches down, and rolls along the main runway, the video signals derived by image generator 8 and inset into the background display are derived by scanning one picture at a time of a different type of film mosaic or matrix of the type illustrated in FIG. 4 wherein the 25 pictures comprising a given film frame again were all taken at the same distance from a reference touchdown point and facing toward the touchdown point, but at slightly varying azimuths as well as elevations from the reference touchdown point. During this phase of simulation individual pictures on successive frames of the type shown in FIG. 4 are scanned, with successive frames carrying pictures taken successively nearer the touchdown point, and as the simulated path of the aircraft being simulated varies above and below the glideslope or departs in azimuth from the center of the glideslope, appropriate different pictures are selected and scanned to produce the video to be inset into the background. When a given one of the pictures is scanned, if the simulator simulates an actual aircraft which varies in elevation or azimuth (or both) from the point where the picture was taken, the FSS scanning raster is "distorted" to provide proper perspective in the scene inset into the background display. After the simulator has simulated an actual aircraft which has touched down, or, more precisely, has proceeded a sufficient distance along the runway and is at a low enough altitude for an assumption to be made that touchdown has occurred, further simulation of changes in elevation need not be provided, and hence from a point T (FIG. 2c) where touchdown may be assumed to have occurred, all of the pictures on matrices corresponding to that of FIG. 4 may be used for photographs taken at the same height at different lateral positions across the runway. This phase, during both approach down the glide path and roll along the main runway will be referred to as the "approach" phase for convenience. During this phase, because the runway picture may be assumed to be within the 60° forward view of the crew in the absence of a gross piloting error, and because crew attention should be focused on the runway, the video signal developed by airport image generator 8 is all inset into the central portion of screen S by projector 2, and projectors 1 and 3 merely provide a blurred background. To better understand this phase, reference may be had to FIG. 5 wherein a glideslope line X—T is shown projecting upwardly (at 2°) from an airport runway 10, with glideslope X—T intersecting runway 10 at touchdown point T. Shown spaced along line X—T and along runway 10 are a plurality of mosaics ($M_1$, $M_2$, ....$M_n$, and $T_1$, $T_2$, etc.) of motion picture film frames of the type shown in FIG. 4. Each mosaic or matrix is shown as comprising a group of 25 pictures (transparencies), with the center picture in each mosaic depicted as having been taken from a vantage point located precisely on glideslope X—T (for the "M" pictures taken prior to touchdown), or from a vantage point along a horizontal reference line X'-X' for those pictures taken after touchdown. Three successive pictures from vantage points located precisely on glideslope X—T comprise the three central pictures $X_1$, $X_2$ and $X_3$ of mosaics $M_1$, $M_2$ and $M_3$ respectively. Pictures $X_1$, $X_2$ and $X_3$ may comprise three successive frames of a motion picture sequence taken as an actual aircraft descends along an actual glidepath, or alternatively may comprise three pictures taken as a camera is maneuvered relative to a scale model.

In addition to the central views taken along the glideslope X—T, each "M" mosaic is shown as including 24 further pictures taken at the same respective distances from touchdown point T, but taken from positions spaced at slight angles from reference glideslope X—T. For example, pictures taken at positions along a line displaced 45 arc minutes to the (pilot's) left from line X-X are labeled $L_{11}$, $L_{12}$, $L_{13}$ in FIG. 5, while pictures taken a further 45 arc minutes, or a total of 1.5° to the left from line X-X are labeled $L_{21}$, $L_{22}$, $L_{23}$. Similarly, pictures $R_{11}$ and $R_{21}$ in mosaic $M_1$ of FIG. 4 are pictures taken 45 minutes and 1.5°, respectively, to the right of line X-X. Pictures marked $U_{11}$ and $U_{21}$ are taken 15 arc minutes and 30 arc minutes, respectively, up from or above glideslope X—T, while pictures labeled $D_{11}$ and $D_{21}$ are taken from similar positions below line X—T. Thus, each mosaic or matrix of 25 pictures includes those taken within an area which varies plus or minus 30 arc minutes (0.5°) in altitude from reference line X—T, and which varies plus or minus 1.5° laterally from glideslope X—T.

If the 25 pictures of the matrix $M_1$ shown in FIG. 4 are assumed, for example, to have been taken 1000 feet out from point T in FIG. 5, with glideslope X—T projecting upwardly at 2.0° in a northerly (0° azimuth) direction, central photograph $X_1$ in such a case would have been taken on line X—T from an altitude of 1000 sin 2° or 34.9 feet. Photograph $L_{11}$, which is displaced 45 arc minutes to the left would have been taken at the same altitude but from a position (sin 45 arc minutes times 1000 feet) or approximately 13.1 feet east of where photo $X_1$ was taken. During the approach phase a filmstrip comprising the successive mosaics $M_1$, $M_2$, $M_3$, $T_1$, $T_2$, etc., is fed to a flying spot scanner at a film speed corresponding to the progress of the simulated aircraft along the simulated glidepath and simulated runway. If the simulator simulates an actual aircraft progressing exactly along glideslope X—T, or more precisely, so that the pilot's eye would travel along line X—T, with no deviation whatever from the X—T path, only the central X pictures $X_1$, $X_2$, $X_3$....$X_n$ would be successively scanned by the scanner and used for the display projected to the students. If, instead, the simulator simulates an actual aircraft approaching on a steeper glideslope exactly 15 arc minutes higher than reference glideslope X—T, only the U pictures $U_{11}$, $U_{12}$, etc. of the mosaics would be scanned by the scanner. In either case, successive mosaics or matrices are presented to the scanner at a rate proportional to the velocity component of an actual aircraft being simulated along path X—T. However, in typical flight, the actual aircraft will wander at various times either above or below, or to the right or left of reference path X—T.

In the invention, as the simulator simulates an actual aircraft which moves within the glideslope envelope covered by the mosaics of the aircraft being simulated within the envelope determines at each instant both which single picture of a given mosaic will be scanned and the nature of the scanning pattern used by the flying spot scanner. For example, as the simulator simulates an actual aircraft which translates to the left within the envelope, the scanner scans the central X pictures with increasing distortion as the simulator simulates an actual aircraft which moves from the centerline of the glideslope X—T out 22.5 arc minutes to the left, but then indexes and begins to scan $L_{11}$, $L_{12}$ or $L_{13}$ pictures with an opposite type of distortion. As the simulator simulates an actual aircraft which proceeds further to the left, the $L_{11}$, $L_{12}$ or $L_{13}$ picture is scanned with decreasing distortion, to where no scanning raster distortion is employed when the simulated aircraft is 45 arc minutes to the left. The same procedure then would be repeated for further simulated motion to the left and indexing to scan $L_{21}$, $L_{22}$ or $L_{23}$ pictures. Similar procedures govern simulated translation to the right, or up or down, and combinations of such deviations from glideslope X—T, or from runway reference line X'-X'. A plot of the amount and direction of lateral distortion against angular deviation $\psi_R$ on either side of the centerline of the glidepath is shown in FIG. 4a together with indications of which frame of mosaic $M_1$ is scanned for a given lateral deviation. A plot for vertical deviation would be identical except for the angular values given.

When the simulator simulates an actual aircraft which reaches a reference point on the main runway, turns from the main runway and proceeds along a service runway, and taxis up to a ramp or gate and stops, the visual display is produced using a third mode of operation which involves scanning successively portions of appropriate ones of a plurality of panoramic pictures which illustrate views as seen from an actual aircraft on the ground, including buildings and the like, and successive panoramic pictures of such a plurality taken at a variety of distances from the airport gate are successively scanned. During this phase, which may be termed the "taxi" phase, the video signals derived from scanning a panoramic picture preferably are applied appropriately to all three projectors to entirely cover screen S. Each film frame used during the taxi phase may comprise a frame similar to that shown in FIG. 4 except that each of the five rows comprises a single panoramic picture, with each picture taken at the same distance from a reference point, such as a gate or ramp, associated with the airport but at a different lateral position on the service runway.

While airport image display generator 8 could use separate flying spot scanners for the several mentioned phases of simulation, it is possible and economically desirable to use the same scanner system for all the films required during an entire mission, by imposing only minor constraints on the flexibility of the system. The films must be arranged, however, for smooth transition from one matrix format to the next, and it is desirable to arrange the filmstrips so that the first matrix to be used in one phase of the mission is adjacent the last frame used in the previous phase of the mission. FIG. 6 illustrates one manner in which successive film sections may be spliced together for such purposes. During a typical mission, the double filmstrip of FIG. 6 will be scanned from one of its center sections 31, 32 out to one end or the other as the mission is completed and ends with the simulator simulating an actual aircraft parked at the ramp.

In the "general airport image" phase of the mission provided as the airport first comes into view, one of center sections 31, 32 is first utilized. Which frame of section 31 or which frame of section 32 will first be scanned depends, of course, upon the simulated azimuth at the moment the range of the simulated aircraft is determined to be sufficiently within range to present a general airport image display and when the range of the simulated aircraft is within that predetermined range, the film drive is slewed to position the frame corresponding to that azimuth to be viewed by the scanner. "Left Turn" section 31 of the filmstrip and "Right Turn" section 32 carry the same frames, but they are printed in reverse order. When a circling approach is to be made, successive azimuth frames of the filmstrip are scanned. The runway direction is assumed to correspond to 0° azimuth insofar as the azimuths indicated adjacent the filmstrip in FIG. 6 are concerned. If the simulator simulates an actual aircraft which has turned left around the airport, the 0° azimuth frame at the end 33 of section 31 will be scanned as the simulator simulates an actual aircraft which comes within the "approach window," and conversely, the 0° frame at end 34 of section 32 will be scanned if a right turn has been effected. In either case, when either frame 33 or frame 34 is reached, the actual aircraft would be in proper position, assuming its elevation is proper, to begin an approach and the simulator would be conditioned to receive the first frame of the approach film section. The pairs of approach, landing, taxi and park sections at opposite ends of the film may be the same, of course, but with succeeding frames running in opposite directions with respect to one another.

To provide a display during a simulated takeoff, the strip section containing the landing frames is employed and advanced in the same direction for takeoff as for landing, the section of filmstrip for either maneuver preferably covering a distance of travel (e.g., 10,000 feet) long enough to allow either maneuver. As the simulator simulates an actual aircraft which begins to lift and immediately after being completely airborne, the FSS scanning raster is distorted to simulate a visual change in altitude. As soon as the simulator simulates an actual aircraft which is airborne, and well before the "taxi" section of frames is reached, the film scanning system is disabled, and the entire image is generated by the background system of the type shown in the Ebeling-Paufve application. The approximate footage of 70 mm. film required for the various phases in an exemplary design of the invention is shown in FIG. 6. The 830 feet provided for a general airport image strip assumes that each frame of that section covers 6 arc minutes of azimuth. An approach strip simulating an approach from 2 miles out with a new frame provided every 10 feet using the 25-picture matrices of FIG. 4 requires approximately 250 feet to 70 mm. film. Landing or takeoff from a 10,000 foot runway also requires about 250 feet. Taxiing and parking require about 120 feet and 50 feet respectively. The total 3,000 feet of film used for a direct approach with the type of turn preestablished may be carried on a spool approximately 16 inches in diameter.

During any phase of the simulated mission the required frame rate can vary from some maximum amount all the way down to zero. For example, the frame rate at which one of the general airport image section 31 or 32 advances will become zero if the simulator simulates an actual aircraft which approaches the airport at a fixed azimuth. For this reason, conventional "stop-motion" film transports using shutters are unsuitable, since intolerable flicker would be produced at low film advance rates, and a continuous projection film advance system is required, just as in the mentioned Hemstreet systems. A variety of continuous projection film advance systems are known in the cinematographic arts and need not be described in detail.

In FIG. 11 the fields or areas covered by the rasters of television projectors 1, 2 and 3 on screen S during a simulated zero bank angle condition are illustrated as rectangles 81, 82 and 83 respectively. If the simulator simulates an actual aircraft which is heading directly toward the simulated airport at a given pitch angle and zero bank angle shortly after the general airport image first comes into view, the general airport image will be inset into the center of the field 82 of middle projector 2, perhaps as shown at 85a in FIG. 11. If the simulator simulates an actual aircraft which instead were heading somewhat to the right of the airport at such a time, but at the same pitch angle and bank angle, the FSS video instead might be inset partially into the field of projector 1, as indicated at 85b. If the simulator simulates an actual aircraft which was heading somewhat to the left of the airport, still at zero bank angle but at a steeper (nosedown) pitch angle, the video might be inset into the field of projector 3, for example, up higher in the field of projector 3 due to the steeper pitch angle, as shown at 85c in FIG. 11. If the simulator simulates an actual aircraft which instead were banked to the right and pitched upwardly but headed directly toward the airport, the inset video would be rotated and shifted downwardly, as depicted by rectangle 85d. During such a banked condition, the entire rasters of all three projectors are tilted or banked on screen S, as indicated by dashed rectangles 81', 82' and 83', so that the "vertical" scan direction of each line of the inset video remains parallel at all times to each "vertical" background scan line. Rotation of the rasters of all three projectors in accordance with simulated bank angle Φ is intended to be illustrated in FIGS. 2 and 15 by a dashed line representing the physical rotation capability of the projector deflection coils. For certain heading conditions it will be apparent that portions of the image must be inset into two of the projector fields, as typified by rectangle 85b. As the simulator simulates an actual aircraft which flies nearer to the airport, the inset video will occupy larger and larger amounts of the screen. Rectangles 85a and 85f both represent the video inset when the actual aircraft being simulated is heading directly toward the airport at the same pitch angle and at zero bank angle, but rectangle 85f, being much larger than rectangle 85a, represents the video inset at a simulated range much closer to the simulated airport.

The deflection control system for the airport image FSS is illustrated in block form in FIG. 7. The sweep generators 20 of the three projectors are shown all triggered simultaneously from the common timing or pulse source 19 which is formed of a 36 kc. oscillator and a 1200-line counter. The 36 kc. oscillator being connected to trigger the three vertical sweep generators, and the output of a 1200-line counter being connected to trigger the horizontal sweep generators at a 60 c.p.s. rate. The same timing source is used to trigger and synchronize the sweep generators of the background image generator 7 which are individually controlled from respective projector sweep generators. For simplicity of drawing, the outputs of the projector sweep generators 20 are not shown as being connected to the background image generator 7 in FIG. 7. However, such connections are necessary for proper operation of the system as illustrated in FIG. 2. While the vertical sweep generators of the three projectors are triggered simultaneously, the instantaneous sweep rates of the three vertical scans are generally not the same when a background is being provided by background image generator 7. The instantaneous vertical sweep rate in the background image generator 7 is varied in accordance with background elevation data in the manner disclosed in the mentioned Ebeling-Paufve application, as illustrated by the input signals on lines 7a, 7b and 7c to the three vertical sweep generators.

Because the instantaneous sweep rates of the three projectors all may and generally will differ, it will be seen to be necessary that video signals to be inset into the field of a given one of the three projectors be synchronized with the sweep signals of that particular projector. For that reason, the basic horizontal and vertical sweep signals associated with each given projector are used as the basic sweep signals for the flying spot scanner 21 while the photomultiplier 24 is generating video signals to be inset into the field of that respective projector.

It will be seen from FIG. 11 that the particular scan line in any projector field when the projector should begin insetting a video signal from the image generator 8 and the particular scan when it should discontinue insetting video signals from the image generator 8 will depend upon the heading of the simulated aircraft relative to the line along which the picture being scanned was taken, and to the simulated range of the simulated aircraft from the simulated airport, as range will determine the size of the image being inset. To provide a scene of the type depicted in FIG. 11 by rectangle 85b, which lies halfway in field 81 of projector 1 and halfway in field 82 of projector 2, with all three projectors progressing simultaneously from left to right across their respective fields with successive upward vertical scans, it will be seen that video signals portraying the right half of the airport image 85b will be generated during the first several scans of a field and applied to projector 2, that no airport image video will be generated or inset into the background for some time while all three projectors scan the middle portions of their fields, and then that video signals portraying the left half of airport image 85b will be generated during the last several scans of the field and will be applied to projector 1.

Throughout the general airport image phase, each projector receives background video signals from the background image generator 7 when it is not receiving FSS generated video from the airport image generator 8. Switching logic circuit 91, which determines at each instant during each field which projector (or projectors), if any, are to receive the FSS generated video from the airport image generator 8, and hence which set of projector waveforms should be used to derive the flying spot scanner sweep waveforms, is described in greater detail in connection with FIGS. 13 and 15. Because the projector fields are scanned regularly, repetitively and simultaneously, but the video signals which they are to display must be derived at different times during a given field, depending upon simulated heading and range of the aircraft being simulated, it will be seen that switching logic circuit 91 must control the FSS scanning system of the airport image generator 8 so that the video required during a given field is both generated during the proper scan lines of the field and routed to be displayed by the proper one of the three projectors. As shown in FIG. 7, outputs of the vertical and horizontal sweep generators of the projectors 1, 2 and 3 are connected to the switching logic circuit 91 which selects and delivers at an output thereof the vertical and horizontal sweep signals of one of the projectors in accordance with the particular projector which is to display the inset image from image generator 8. In order to make this selection, range and heading signals are supplied to circuit 91 from the flight computer 17 by means of a cable 26.

In FIG. 7 the output signals on lines 94, 95 from switching circuit 91 carry, during each projector scan line, the horizontal and vertical sweep waveforms $H_t$ and $V_t$ of the particular projector selected by switching circuit 91 to display the video signal resulting from a given vertical scan line of FSS 21. During the general airport image phase of a mission, the waveforms $H_t$ and $V_t$ are modified by distortion computer 96, which provides FSS raster distortion as a function of $\gamma_r$, the difference between instantaneous aircraft elevation angle (relative to the airport) and the reference elevation angle at which the photograph then being scanned was taken. Various functions which determine the amount and type of distortion to be performed by computer 96 are supplied thereto from flight computer and control system 17 by means of a cable 27. If instantaneous aircraft position coincides with the reference elevation at which the transparency then being scanned was taken, distortion computer 96 does not modify the relative amplitudes of the $H_t$ and $V_t$ waveforms. If, however, the simulator elevation angle exceeds the transparency reference elevation angle, the vertical sweep amplitude of waveform $V_t$ is proportionally reduced, so that the vertical height of the FSS raster is reduced, with the result that the video signal derived during a given time interval of an FSS vertical scan will be spread out over a larger portion of the projector vertical scan which displays it, thereby stretching out the display video signal on the screen. When simulator elevation is less than the transparency reference elevation a converse adjustment occurs. Distortion computer 96 is described below in greater detail in connection with FIG. 14.

In addition, the various functions supplied to the distortion computer 96 from the flight computer 17 may dictate a distortion of the waveforms of signals $H_t$ and $V_t$ to simulate a change in heading.

The output waveforms $H_a$ and $V_a$ from distortion computer 96 are applied to raster position computer 99, which also receives an input signal commensurate with simulated pitch angle, and from that input signal controls the positioning of the FSS scanning raster relative to the picture being scanned, in order that the video signals produced by the FSS be properly synchronized with the sweep waveforms of the particular one of the three projectors selected at any instant to display the FSS video signal. During all phases of a mission, it will be appreciated that simulated nosedown pitching requires that the airport image be inset up higher in the window scene received by the students, and to provide that effect, raster position computer 99 moves the FSS raster upwardly and downwardly on the photograph being scanned as a function of simulated pitch angle. During the general airport image phase of a mission, changes in simulated heading affect switching circuit 91 to determine during which scan lines of a field a selected one (or two) of the projectors receive the generated video, and affect raster position computer 99 to approximately position the FSS raster relative to the picture being scanned, and hence determine the position of the image in a left-right sense in one (or two) of the projector fields. Changes in simulated bank angle do not cause rotation of the FSS raster relative to the photograph being scanned, and each scan line across the photograph remains vertical even though the simulated aircraft banks. Simulation of bank angle is preferably effected, as mentioned above, by tilting the rasters swept by projectors 1, 2 and 3 in accordance with simulated bank angle. During the approach phase of a mission when all of the FSS airport image video is inset into the field of central projector 2, simulated pitch angle changes continue to raise or lower the position of the video inset in the projector 2 field, bank angle changes continue to rotate the projector rasters, and changes in simulated heading continue both to determine which vertical scan lines of projector 2 carry which lines of video generated by the FSS and to horizontally position the FSS raster on the picture being scanned. A simplified form of raster position computer is described below in connection with FIG. 16. As shown in FIG. 16, raster position computer 99 may comprise a simple adder circuit 16A1 for adding a signal $\sin \theta$ commensurate with pitch angle to the vertical sweep waveform which has been selected by switching circuit 91 (FIG. 7) and distorted by distortion computer 96. As the simulator simulates an actual aircraft which pitches downwardly, the negative $\sin \theta$ quantity lowers the DC level of the vertical sweep waveform, thereby lowering the FSS raster on the picture being scanned and thereby raising the position of the inset video in the final display. Simulated pitching affects the position of the video in the same manner during all phases of the mission.

During the general airport image phase, the selected picture is scanned with a raster of 600 lines progressing from left to right by the three projectors. In order that the video to be generated and applied to one (or two) of the projectors during a given 600-line field be properly generated as it is switchably applied to one or two projectors, raster position computer 99 must approximately position the origin of the FSS raster to one (or two) locations relative to the selected picture during each 600-line field.

In FIG. 16 a signal on line 129 which varies in accordance with simulated heading and which is derived in a manner explained below in connection with FIG. 13, is applied to amplifier 16A2 to be added to the horizontal waveform $H_a$ from distortion computer 96. During the taxi phase a portion of the panoramic strip is displayed on all three projectors, with the FSS output being multiplexed between the three projectors, and during that phase counter 801 and gates 803, 805 and 808 provide three different signals to amplifier 16A2 for each three successive FSS vertical scans, as will be explained below in greater detail.

Waveform $H_b$ and $V_b$ from raster position computer 99 are routed to a high bandwidth multiplier circuit 105, preferably comprising two diode "quarter-squares" multipliers, for example, wherein each waveform is multiplied, during the general airport image phase, by a function of the instantaneous range R of the simulated aircraft from the airport, to vary the waveform amplitudes and hence the size of the FSS raster. As simulated range decreases, multiplier circuit 105 proportionally decreases the horizontal and vertical sweep amplitudes, thereby decreasing the size of the FSS raster, which results in an increase in the size of the general airport image in the final display. During the approach phase, changes in range are preferably simulated by substitution of successive film frames each taken closer to the airport, and hence it is unnecessary for multiplier system 105 to vary the sweep amplitudes during that phase. However, in some embodiments of the invention it may be desirable to utilize multiplier 105 to vary the sweep amplitudes during this phase, which will allow the use of fewer film frames taken greater distances apart. The control of multiplier system 105 will be seen to provide an effect similar to that which a "zoom" lens provides on a projected picture.

The output waveforms $H_c$ and $V_c$ on lines 107 and 108 are applied to adder circuits 113 and 114 to be added to respective $F_H$ and $F_V$ signals representing the coordinates on the frame or matrix then in front of the FSS, of the center of the particular one picture to be scanned. Thus, The $F_H$ and $F_V$ signals position the FSS raster relative to a 50-picture frame during the general airport image phase so as to scan the appropriate one of the 50 pictures, and to approximately center the origin of the FSS sweep system at the center of the selected picture. During the approach phase, the $F_H$ and $F_V$ signals position the FSS raster relative to one picture of a 25-picture film frame, and during the taxi phase relative to one strip of five panoramic filmstrips contained in a film frame. The $F_H$ and $F_V$ signals may be derived from simple decoder circuits in a manner to be described in connection with FIG. 12.

The output signals $H_d$ and $V_d$ on lines 115 and 116 are applied to conventional driver amplifier circuits shown at 118 and the output signals from driver circuits 118 drive the deflection yoke 120 of the FSS. Because optimum focus depends upon instantaneous deflection, a known form of focus computer 122 is preferably provided to receive deflection signals $H_d$ and $V_d$ and to provide compensating variations in the current in focus coil 124, thereby to provide uniform spot focusing over the entire FSS scanning raster. The FSS raster may extend over more than one picture of a matrix, but the video signals from only one picture at a time should be inset, and accordingly it becomes necessary to blank out the FSS when the FSS spot reaches the edges of the particular picture being scanned. Unblanking circuit 125 receives the $H_d$ and $V_d$ sweep waveforms and the $F_H$ and $F_V$ signal, and blanks out the FSS during those times when the FSS beam would extend vertically or horizontally outside the edges of the particular picture being scanned. The unblanking circuit may comprise a plurality of simple comparator circuits (not shown), one of which blanks out the FSS whenever the instantaneous value of the $V_d$ waveform exceeds $(F_V-k)$, and another of which blanks out the FSS when the instantaneous value of the $V_d$ waveform becomes less than $(F_V-k)$, where $k$ is a constant equal to one-half of the height of the picture being scanned. Different values of $k$ representing different picture heights are applied to the comparators during the three different phases of operation, by contacts (not shown) of switching circuits (P1, P2, P3) described below. A further pair of similar comparators (not shown) responsive to the $H_d$ waveform, the $F_H$ voltage signal, and a further constant $k'$, similarly blank out the FSS when $H_d$ becomes greater than $(F_H+k')$ or less than $(F_H-ka:)$, where $k'$ is a constant equal to one-half of the picture width.

Thus, it will be seen that generation of the general airport image requires (1) that the film drive slew the filmstrip in accordance with the bearing of the aircraft being simulated to position a given 50-picture frame of the 70 mm. filmstrip in front of the FSS, (2) that an elevation decoder circuit receive an input commensurate with the elevation angle of the aircraft being simulated relative to the airport and provide proper $F_H$ and $F_V$ positioning signals to center the origin of the FSS scanning system over the proper one of the 50 pictures, (3) that the multiplier circuit 105 control the FSS raster size in proportion to simulated range R from the airport, (4) that the raster position computer 99 appropriately shift the FSS raster to locate the airport image in the proper vertical position relative to the projector fields, and hence relative to the simulator cockpit windows, (5) that the distortion computer appropriately distort the FSS raster in accordance with the difference between the instantaneous elevation angle of the simulated aircraft and the reference elevation angle from which the picture being scanned was taken, and (6) that switching circuit 91 select for each vertical scan of the FSS the basic sweep waveforms from the particular projector upon which the FSS video resulting from that scan is to be displayed, and route the generated video to the appropriate one of the projectors.

The operation of the system of FIG. 7 perhaps may be better understood by considering the derivation of the FSS sweep waveforms in the reverse order from that shown in FIG. 7. The $F_H$ and $F_V$ signals select a particular picture by approximately centering the FSS raster relative to one picture. The multiplier 105 determines the size of the FSS raster. Position computer 99 shifts the raster up or down relative to the selected picture, and distortion computer slightly distorts the shape of the FSS raster to simulate changes in perspective. Switching logic circuit 91 determines which projector is to display the video generated during a given vertical scan.

The operation of the FSS scanner deflection system of FIG. 7 during the "approach" phase (i.e., final approach, touchdown and roll along the main runway) is very similar to the operation described above in connection with the general airport image phase, with some differences which now will be discussed. As the simulator simulates an actual aircraft which flies down the glideslope, or more precisely, within the glideslope envelope, successive frames of the approach film are presented to the FSS at a rate corresponding to the component of simulated aircraft velocity along the glideslope. Because the pictures on successive frames of the approach filmstrip were taken at small distance increments down the glideslope, it becomes unnecessary to decrease FSS raster size as a function of range to enlarge the image in the projected display, as is done in the case of the general airport image, an accordingly, the range R input signal to multiplier 105 may be replaced by a fixed potential $k_1$. If it is desired, however, in certain simulation applications, to simulate an approach with a fewer number of frames taken a greater distance apart, the transition from one frame to the succeeding adjacent frame may be smoothed or interpolated by applying slight sawtoothlike input signals to multiplier circuit 105, to slightly gradually decrease the FSS raster size as each picture is scanned by the FSS and then reset the multiplier range input signal to a reference level as a new picture is presented to the FSS.

Also, while the input signal to multiplier 105 frequently will be held constant as the simulator simulates an actual aircraft which descends along the glideslope because successive frames along the approach strip were taken the same distance apart, it sometimes becomes desirable to use different frame spacings during different portions of the approach phase, in order that the photographs used may be taken different distances apart. In such cases, for example, one fixed input $k_1$ may be applied to multiplier 105 during one portion of the approach phase, when successive frames were taken 10 feet apart, and a second fixed input $k_2$ where successive frames were taken 5 feet apart. As the simulator simulates an actual aircraft which travels along the ground on the main runway, as the pilot's viewpoint deviates to the left or the right from the center of the main runway, the FSS scanner scans the center transparency in each frame with increasing distortion, then indexes to an adjacent transparency which it scans with an opposite-type distortion as the deviation increases out to the center of the adjacent transparency, as was explained above in connection with FIG. 4a. The manner in which a given picture must be geometrically distorted in order to simulate viewpoint displacements above or below, or to the right or left, of a glidepath are explained in detail in various of the mentioned Hemstreet patents and need not be described herein in great detail. Briefly, simulation of vertical displacement from the viewpoint at which a picture was taken to a different viewpoint is effected by expanding or compressing the picture relative to the horizon in accordance with the ratio between the altitude of the two different viewpoints, and simulation of horizontal displacement is effected by displacing each element in the projected picture horizontally in an amount directly proportional to the horizontal displacement between the viewpoints and in an amount inversely proportional to viewpoint altitude. Operation of distortion computer 96 to provide these effects is described below in connection with FIG. 14, wherein the distortion computer is considerably simplified. Because compressing or expanding an image vertically to provide perspectively correct images with altitude changes and "shearing" the image to simulate lateral displacement should be done relative to the vanishing point or horizon, the distortion computer in general may be simplified if all of the pictures have their tops, or some fixed portion, carrying the horizon. During the approach phase raster position computer 99 receives the same type of input signals and operates in exactly the same manner as it did during the general airport image phase to position the inset video image on screen S, although much less shifting of the image is required due to the smaller heading and pitch angle excursions occurring during an ordinary approach and landing.

As mentioned above, because pilot attention is normally focused straight ahead during approach and landing, the video signal generated during this phase of the mission is preferably provided entirely on center projector 2, and side projectors 1 and 3 merely provide background video generated by background video generator 7. Accordingly, a portion of switching logic system 91 continuously connects the $H_2$ and $V_2$ sweep potentials to lines 94 and 95 for derivation of the FSS sweep waveforms during the approach phase as is described below in connection with FIG. 13. As in the general airport image phase, $F_H$ and $F_V$ signals are computed and applied to adder circuit 113 to index the FSS raster origin to the appropriate picture on the particular 25-picture frame presented to the FSS at any time. During most of the approach phase, and while the 25-picture frames utilize the format shown in FIG. 4, the $F_H$ and $F_V$ signals are computed in accordance with viewpoint displacement left or right or up or down from the position represented by the center transparency in each frame. However, when the simulator simulates an actual aircraft which has traveled a predetermined length along the runway, an assumption is made that the simulated aircraft, in the absence of gross pilot error, is on the ground, and the remaining film frames of the approach strip utilize a different format, which, in turn, requires that the $F_H$ and $F_V$ signals be generated in a different manner, as is explained below in connection with FIG. 12. The remaining frames preferably each contain 25 pictures all taken from ground altitude (i.e., pilot's eye altitude when the aircraft main landing gear has touched down). During the taxi phase wherein each frame comprises five panoramic strips, the $F_H$ and $F_V$ signals are generated in still a different manner, also explained below in connection with FIG. 12.

In order to avoid disconcerting jumps in the final display as the FSS indexes from one picture to another, it is necessary that the origin of the FSS scanning system be located with great accuracy relative to each picture which it scans. The feedback type of raster centering system shown in FIG. 8 may be employed to position the FSS raster with an accuracy of the order of 0.0005 inch. A beam splitter in the form of dichroic mirror 144 is interposed between scanner FSS and the film to reflect a portion of the ultraviolet content of the scanner beam through collimating lens 146 and objective lens 147 to a centering mask 142. Ultraviolet light passing through centering mask 142 is directed onto photomultiplier 150 by means of field lens 152.

Centering mask 142 is illustrated in FIG. 9 as comprising a matrix of 25 squares, with each square comprising two transparent triangles $142_a$ and two opaque triangles $142_b$. During the general airport image phase when one picture of a 50-picture matrix of the type shown in FIG. 3 is being scanned, it will be seen that the ultraviolet beam will scan one-half of one of the 25 squares of mask 142 (i.e., a portion of mask 142 either of the type such as is illustrated in FIG. 9a or an inverted portion of the same type). During the approach phase when one picture of a 25-picture matrix of the type shown in FIG. 4 is being scanned by the FSS, the ultraviolet beam will scan an entire square of the type shown in FIG. 9b on mask 142 and during the taxi phase when a panoramic picture is being scanned by the FSS, the ultraviolet beam will scan five laterally spaced squares, such as shown in FIG. 9c.

Considering first the approach phase and the single square shown in FIG. 9b, it will be seen as the ultraviolet light beam scans the square there shown, that because of the diagonal transition lines, at the time of any transition of the ultraviolet light beam, either from opaque to transparent or from transparent to opaque, that the magnitude H of the horizontal coordinate of the ultraviolet light beam will exactly equal the magnitude V of the vertical coordinate, or otherwise expressed, that H will equal V or —V. To determine the exact position of the FSS raster relative to centering mask 142 (and hence relative to the film being scanned), the output signals from raster position computer 99 are compared with the output signal transitions of photomultiplier 150 by means of the raster position error computer (shown as a block 228 in FIG. 8 and shown in detail in FIG. 10) to derive horizontal and vertical position error signals $H_e$ and $V_e$, which are summed by means of amplifiers 113 and 114 with the $H_c$ and $V_c$ waveforms and the horizontal and vertical frame command signals $F_H$ and $F_V$ to compensate for or cancel any horizontal or vertical errors in the positioning of the origin of the FSS scanning raster relative to the centering mask 142. The output signals of amplifiers 113 and 114 are applied to the deflection driver amplifiers of deflection driver circuit 118, thereby providing closed-loop positioning of the FSS raster relative to centering mask 142.

The $H_c$ and $V_c$ sweep waveforms from the multiplier 105 represent at any instant the desired coordinates of the FSS spot relative to the center of the photograph being scanned. As shown in FIG. 10, signal $H_c$ is applied directly to level detectors 241 and 246, while vertical signal $V_c$ is applied directly to level detector 246, and inverted by amplifier 239 and applied to level detector 241. The level detectors shown in FIG. 10 each comprise conventional comparator circuits which provide an output signal when the sign of the sum of their input signals changes. Thus, level detector 241 provides a logic "1" output signal when the $H_c$ signal magnitude equals the negative value of the $V_c$ signal magnitude, and level detector 246 provides a logic "1" output signal when the $H_c$ signal magnitude equals the negative value of the $V_c$ signal magnitude, and level detector 246 provides a logic "1" output signal when the $H_c$ waveform equals the positive value of the $V_c$ waveform.

Assume that the ultraviolet light portion of the FSS beam scans downwardly through the centering mask square shown in FIG 9b. It will be seen that the output signal of photomultiplier 150 will swing from a first signal level to a second level upon the initial transition from opaque to transparent thereby turning on a Schmitt trigger 260 in FIG. 10, and will swing back to the first level later during the scan upon the later transition from transparent to opaque. While trigger 260 is "on," an output signal will be applied therefrom to a horizontal error integrator 286. If the origin of the FSS raster is exactly centered on the center of the square, it will be seen that the photomultiplier will change state precisely when $H_c=+V_c$, and $H_c=-V_c$. When the amplitude of horizontal sweep waveform $H_c$ equals the amplitude of vertical sweep waveform $+V_c$, level detector 246 provides a logic 1 signal via OR gate 254 to set flip-flop 256, and when $H_c=-V_c$, level detector 241 provides a logic 1 signal via OR gate 252 to reset flip-flop 256. Thus, if the origin of the FSS scanning raster is properly positioned on the centering mask, flip-flop 256 will be set for exactly the same amount of time as trigger 260 is turned on. The output signal of flip-flop 256 is applied through OR circuit 281 to apply a predetermined amplitude current to horizontal integrator 286. Trigger 260 and OR gate 281 are arranged to apply opposite sense currents to integrator 286, and hence the signals from trigger 260 and flip-flop 256 will cancel and provide no net input signal to integrator 286 if the FSS raster is properly centered in a horizontal sense. It will be apparent now that a horizontal displacement error in the position of the raster relative to the mask in one direction or the other would increase or decrease the trigger 260 "on" time during a given scan, and hence provide a net error input to integrator 286 commensurate with the amount and direction of the displacement error.

If the FSS raster origin is properly positioned horizontally but displaced in a vertical sense, it may be seen that the trigger 260 output pulse during the trigger "on" state will have the same duration as the flip-flop 256 "set" period, but that the two pulse periods will only partially overlap, with their respective leading and trailing edges occurring at different times. Assume that the trigger 260 output goes positive upon a transition from opaque to transparent, thereby setting flip-flop 271 and applying an output signal via OR gate 283 and inverter amplifier 259 to vertical error integrator 285, and that shortly thereafter, due to a slight vertical positioning error, $H_c=+V_c$ (i.e., that horizontal sweep amplitude equals the vertical sweep amplitude); the flip-flop 256 is set (via 246 and 254) and an output is provided from OR gate 281 to integrator 286. The output signal from gate 281 is also applied to reset flip-flop 271. Later during the same scan, the transition from transparent to opaque provides a negative output signal from trigger 260, thereby setting flip-flop 272 for a short interval until $H_c=-V_c$, at which time the resetting of flip-flop 256 (via 241 and 252) provides an output signal via OR gate 281 to reset flip-flop 272. During the brief set times of flip-flops 271 and 272, error signals will be applied to vertical error integrator 285. For vertical positioning errors in the opposite direction, it will be seen instead that flip-flops 273 and 274 will be set by the output signals from OR gate 281 when $H_c=+V_c$ and $H_c=-V_c$, respectively, and each then reset shortly after it was set by output signals from trigger 260. Thus, error signals commensurate with the sense and magnitude of a positioning error either vertically or horizontally or in both directions are derived from integrators 285 and 286, and added to the output signals of multiplier 105 to continuously control the raster system origin position with great accuracy.

The operation during the general airport image phase and during the taxi phase is largely similar. During the general airport image phase when mask portions of the type shown in FIG. 9a are scanned, it will be seen that the opaque-transparent transitions occur at coordinates of $H=V+d_1$ and $H=V-d_1$ where $d_1$ is a constant corresponding to one-fourth of the picture width. As shown in FIG. 10, $+d$ and $-d$ constant voltages are summed into level detectors 242, 247 and 244 and 249, respectively, together with the $H_c$ and $V_c$ sweep waveforms, so that switching of these level detectors provide output signals at the instants when the ultraviolet light beam should cross the opaque-transparent transition lines in a centering mask portion of the type shown in FIG. 9a or when an inverted portion of the same type is scanned. These level detectors switching times are compared with the actual switching times of the trigger 260 in a similar manner to apply error pulses to integrators (or low-pass filters) 285 and 286 to derive similar centering error signals $H_e$ and $V_e$.

During the taxi phase, when the FSS is scanning completely across a panoramic transparency, so that the ultraviolet light beam is scanning a centering mask portion of the type shown in FIG. 9c, it will be seen that opaque-transparent transitions occur at points which may be described by the following equations:

$H=V$  $H=V-4d$  $H=V+4d$  $H=V-8d$  $H=V+8d$
$H=-V$  $H=-V-4d$  $H=-V+4d$  $H=-V-8d$  $H=-V+8d$

In FIG. 9c sample transition points corresponding to the first five equations are indicated at points labeled A and sample points for the last five equations are labeled B. As shown in FIG. 10, inputs corresponding to the first equation are applied to the level detector 246; inputs corresponding to the second equation are applied to the level detector 250; inputs corresponding to the third equation are applied to the level detector 248; inputs corresponding to the sixth equation are applied to the level detector 241; inputs corresponding to the seventh equation are applied to the level detector 245; and inputs corresponding to the eighth equation are applied to the level detector 243. Inputs corresponding to the fourth, fifth, ninth, and 10th equations are applied to additional level detectors (not shown) which operate in a similar fashion through the OR gates 252 and 254 to provide vertical and horizontal position error signals from the integrators 285 and 286.

A simplified schematic diagram illustrating how the airport image generator may be automatically controlled through its several phases by conventional flight simulator signals is shown in FIG. 12. In many modern flight simulators much of the computation and control illustrated in FIG. 12 as using analog computer techniques would actually instead be performed in a digital computer. Also, the control system shown in FIG. 12 has been simplified in certain respects, for simplicity of explanation, from that form which an analog simulator embodiment of the invention would take, with certain computations being shown as involving angles, for example, while an actual simulator might utilize functions of angles or ratios between distances to provide the same overall functions. In FIG. 12 input signals commensurate with simulated aircraft North-south and East-West map distances ($X_a$ and $Y_a$) relative to a reference point, aircraft heading $\psi a$, and aircraft altitude above sea level $h_a$ are applied to computer 200 from the flight simulator, and input data representing the desired airport main runway direction $\psi L$ and the airport field elevation above sea level $h_s$ are set into computer 200 by the instructor by means shown as knobs 301—304. From these inputs the computer continuously computes range R between the aircraft and one or the other of two reference points (O and O') at the airport. $\psi R$, the bearing of the aircraft from the airport relative to the airport runway direction, and the elevation angle $\gamma$ of the line-of-sight between the aircraft and reference point 0 at the airport. These computations are simple additions, subtractions and coordinate conversions widely used in flight simulators.

When the simulator simulates an actual aircraft which comes within a predetermined range (e.g., 4 miles) from the airport, the range potential R decreases sufficiently to switch comparator 305 (center-right in FIG. 12) and energize relay R1, thereby energizing relay P1, to begin the general airport image phase. Energization of relay P1 will be seen to connect the $\psi R$ potential from computer 200 via scaling resistor R–301 to film drive servo M–201, and hence servo M–201 drives the filmstrip to position before the FSS the particular 50-picture matrix carrying those pictures taken at the instantaneous azimuth $\psi R$ from the airport. During this phase film drive servo M–201 is connected to operate as a completely conventional position servo. Further contacts (not shown) of relay P1 connect a followup potentiometer (not shown) within servo M-201 to provide position feedback to the servo. Energization of relay P1 also will be seen to apply the range potential R via line 306 to multiplier circuit 105 to control the size of the general airport image in the display, and to apply the elevation deviation angle potential $\gamma_r$ to distortion computer 96 to appropriately distort the projected image. The elevation angle potential $\gamma$ is applied to encoder 201a, which encodes the elevation angle into two digital signals which represent the coordinates of the center of the particular picture of the 50-picture matrix to be scanned, a 3-bit signal representing a selected column of the five columns of pictures in each matrix, and a 4-bit signal representing a given row of the 10 rows of pictures of each matrix. It will be appreciated that the manner in which successive elevation pictures are arranged in order in FIG. 3 allows the use of a very simple encoder including a column counter which merely counts repeatedly upwardly and downwardly through a count of five as elevation angle increases, incrementing a row counter each time the count reverses at the end of each row. The encoder row and column signals are separately decoded by decoder 201b which may comprise two simple ladder networks, to provide the $F_H$ (column) and $F_V$ (row) signals (shown applied to adders 113 and 114 in FIG. 7) during the general airport image phase. As well as providing digital signals to determine the $F_H$ and $F_V$ signals, encoder 201a produces an analog remainder signal $\gamma_r$ representing the difference between instantaneous elevation angle and the precise elevation angle from which the picture represented by the two digital numbers was taken. As mentioned above, the analog remainder signal is routed to distortion computer 96 during the general airport image phase for use in appropriately distorting the FSS scanning raster.

When the simulator simulates an actual aircraft which reaches a proper range to begin an approach, the switching of comparator 207 energizes relay R2, which in turn energizes relay P2 is the contacts of relays R-A2 and R-A3 are then closed, Relays R-A2 and R-A3 are controlled by the $\psi_R$ relative bearing potential via comparators 308 and 309, with relay R-A2 being closed only when the aircraft is to the left of a bearing representing the right edge of the ILS beam and with relay R-A3 being closed only when the aircraft is to the right of a bearing representing the left edge of the ILS beam, and accordingly, it will be seen that relay P2 will be energized only when the aircraft is laterally within the glideslope envelope as well as within a predetermined range.

In order to more accurately synchronize the filmstrips with the scanning system, the approach and taxi phases of the film preferably are coded along their "sound" tracks. A photocell pickup PC which senses code marks along the sound track applies pulses, which are shaped by amplifier A-300, to counter 310. Passage of film frames past photocell PC and the FSS generates a series of pulses which are applied to digital counter 310 to provide a precise digital number inversely representing the range from which the 25 pictures of the frame then before the flying spot scanner were taken. As soon as an approach frame is positioned before photocell PC and the FSS, a pulse is sensed from the film and applied to counter 310, and as the film is driven past the projector during the approach and taxi phases, additional pulses spaced along the sound track of the film are applied to counter 310. A group of the least significant stages of counter 310 are connected through OR gate 311 to energize relay RF1 at the beginning of the approach strip, and energization of relay RF1 in turn energizes relay P2A to commence operation of the "pretouchdown" portion of the approach phase. Energization of relay P2 will be seen to disable relay P1. With relays P2 and P2A energized and relay P1 deenergized, it will be seen that film drive servo M-201 will no longer be driven in accordance with azimuth $\psi M$, but instead in accordance with range, by means of a potential applied to the film drive servo via resistor R-302. Operation of relay P2A will be seen to apply a constant potential $k_1$ (commensurate with the distance between successive frames during the pretouchdown portion of the approach phase) to multiplier circuit 105. Encoder 202a receives an input $\gamma$ commensurate with the elevation angle of the simulated aircraft relative to the airport and an opposite input $-\gamma_g$ commensurate with the elevation angle of the glideslope along which the pretouchdown pictures were taken and encodes their difference, providing a digital signal to decoder 202b, which is decoded by decoder 202b to provide an analog $F_V$ signal to determine in which row of the 25-picture matrix a picture is to be scanned, and providing an analog remainder signal $\gamma_2$ to distortion computer 96 in order to distort the projected inset in accordance with the difference in elevation angle between the instantaneous aircraft position and the elevation angle from which the picture selected by the $F_V$ signal was taken.

Encoder 203a receives the $\psi_R$ relative azimuth signal from computer 200 and encodes it into a 3-bit digital signal representing which column of the 25-picture matrix is to be scanned and an analog remainder signal $\psi_{R2A}$. The digital signal is decoded by decoder 203b to provide the $F_H$ signal, and the analog remainder signal is applied to distortion computer 96 in order to "shear" the image in accordance with the azimuthal difference between instantaneous aircraft position and the azimuth from which the picture selected by the $F_H$ signal was taken. During this portion of the approach phase, in order to provide a position feedback potential to film-feed servo M-201, the count in counter 310 is converted to an analog potential by digital-to-analog converter 318 and applied, together with bias potential $k_4$, to control servo M-201.

When the simulator simulates an actual aircraft which has passed over the runway threshold and proceeded along the runway as far as point T in FIG. 2c, the pulse count accumulated in counter 310 will have increased to where one or the other of a group of the middle stages of counter 310 will provide an output via OR gate 315 to energize relay RF2, which disables relay RF1, and hence relay P2A. Assuming that simulated altitude is below a selected level, so that the simulated aircraft is on the ground and relay K—H has been closed by the output of comparator 314, energization of relay RF2 will in turn energize relay P2B to begin the latter portion of the approach phase. Energization of relay P2B does not alter control of the film drive servo, which continues to be controlled in accordance with range, but it will be seen that a different constant $k_2$ proportional to a different distance between successive frames is shown applied to multiplier circuit 105. Because the simulator simulates an actual aircraft which is now on the ground, neither the elevation angle $\gamma_r$ potential nor the glideslope elevation angle $\gamma_2$ potential need be applied to distortion computer 96. All 25 pictures of a given frame now represent views at 25 different azimuthal positions spaced across the runway at the same altitude. Encoder 204a encodes azimuth angle $\psi_R$ in a manner analogous to that in which encoder 201a encodes $\gamma_r$, to provide a 3-bit "row" input and a 3-bit "column" input to decoder 204b, thereby to provide the analog $F_H$ and $F_V$ signals during the post-touchdown portion of the approach phase, and encoder 204a also provides an analog remainder potential $\psi_{R2B}$ representing the difference in azimuth between the instant viewpoint and the precise azimuth from which the picture represented by the encoder digital output signal was taken, and the $\gamma_{R2B}$ remainder potential is applied to distortion computer 96.

When the simulator simulates an actual aircraft which reaches a given distance ($R_L$ in FIG. 2c) from reference point O, the most significant digits of the number in counter 310 operate flip-flop 312 through OR gate 313, thereby energizing relay RF3, which disables relay RF2 and energizes relay P3 to initiate the taxi phase. Energization of relay RF3 also connects potentials corresponding to M, N and $\psi_{AR}$ (see FIG. 2c) to computer 200 to shift the reference axis for further simulation from point O on the main runway to point O' at the gate in front of the terminal building. The M and N potentials are resolved in accordance with the selected main runway heading $\psi_R$ in computer 200. With relay P3 energized it will be seen that film drive servo M-201 will continue to be controlled by the range potential R, (although with a different scale factor determined by R-315) so that the film will be advanced throughout the taxi phase as the aircraft proceeds along the auxiliary runway, and multiplier circuit 105 will be controlled by a third constant quantity $k_3$ representing the distance between the successive locations at which successive panoramic strip frames were taken down the auxiliary runway. Encoder 205a receives the $\psi_R$ potential representing aircraft bearing from point O', and hence aircraft lateral position on the auxiliary runway, and encodes it into a multibit digital signal. The multibit digital signal is decoded in decoder 205b and applied through a contact of relay P3 to provide the $F_V$ signal to determine which row (i.e., which of the five panoramic strips) of the frame will be scanned. Encoder 205a also provides an analog remainder signal $\psi_{R3}$ commensurate with the lateral distance between the simulated aircraft position on the auxiliary runway and the lateral position from which the strip selected by the encoder 205a digital output was taken, and the analog remainder signal is routed to distortion computer 96 to "shear" the image in accordance with that distance. Because the five strips of a given frame are taken at lateral increments of only about 8 feet, very little distortion need be introduced, and in some embodiments of the invention such lateral distortion may be omitted. Energization of relay P3 also applied the simulated aircraft heading quantity $\psi_a$ to provide the $F_H$ signal to control which portion of the selected panoramic strip will be scanned.

While a plurality of separate encoders and decoders are shown in FIG. 12, it should be appreciated that only one or two of them are operative during a given phase or mode, and that many fewer encoders and decoders may be used by switching them to successive different configurations during the successive phases of a mission.

A very simplified form of raster distortion computer is shown in FIG. 14. During the general airport image phase relay P1 is closed, and the vertical sweep waveform $V_i$ of the particular projector selected by switching logic circuit 91 to display the video to be generated by the FSS is applied to diode multiplier 401, which is also supplied with the $\gamma_r$ remainder elevation angle signal from encoder 201a and with an opposite polarity bias term $k_5$. As the absolute value of the elevation angle remainder signal $\gamma_r$ increases positively, signifying that the instantaneous viewpoint is above the location from which the picture being scanned was taken, the absolute value of the output of amplifier A-401 decreases, so that the vertical waveform $V_a$ amplitude decreases, with the end result that the video developed during each vertical scan is spread over a greater vertical distance in the final display, thereby simulating the effect of viewing the scene portrayed from a greater elevation angle. An opposite effect is produced, of course, as the elevation angle remainder $\gamma_r$ decreases. Because lateral viewpoint shift is accomplished during this phase by film frame substitution rather than raster distortion, the selected horizontal sweep waveform $H_i$ is applied directly through distortion computer 96, both inputs and the output of a function generator 403 being zero.

During the first portion of the approach phase relay P2A is closed, and both the horizontal and the vertical sweep waveforms are distorted as elevation angle and azimuth angle vary. The analog remainder signal $\gamma_2$ from encoder 202a operates similarly to the $\gamma_r$ effect during the previous phase to vary the vertical sweep amplitude. The remainder quantity $\psi_{R2A}$ from encoder 203a (FIG. 12) represents the lateral angle between the instantaneous viewpoint and the position from which the pictures being scanned was taken. This potential is applied to function generator 403 to inversely multiply the vertical sweep waveform $V_i$, thereby to provide an output signal which decreases from a maximum value at the bottom of the picture (which value is proportional to the deviation $\psi_{R2A}$ of the viewpoint from where the picture being scanned was taken) to a zero value at the top of the picture being scanned. The output signal from function generator 403 is added to the projector horizontal waveform $H_i$. It will be seen that as lateral deviation $\psi_{R2A}$ increases from zero in one direction or the other, that the FSS scanning raster lines will increasingly slant from a vertical direction in one direction or the other.

During the second portion of the approach phase, where touchdown of the simulated aircraft is assumed to have occurred, relay P2B is closed and the analog remainder potential $\psi_{R2B}$ from encoder 204a (FIG. 12) is applied to function generator 403 similarly to simulate lateral viewpoint shift, and because elevation angle is fixed, the selected vertical waveform $V_i$ is applied through multiplier 401 unvaried by elevation angle deviation, a constant signal $k_6$ being applied as one input to multiplier 401. During the taxi phase relay P3 is closed and the vertical sweep waveform remains unvaried by the raster distortion computer, a constant $k_7$ being applied to multiplier 401, but the remainder signal $\psi_{R3}$ from decoder 205a may be applied to function generator 403 to similarly simulate lateral deviation from the reference location from which the picture being scanned was taken. In certain embodiments of the invention it will be deemed preferable to apply a constant voltage to the function generator 403 in lieu of the $\psi_{R3}$ potential during the taxi phase, omitting the distortion as a function of lateral deviation during the taxi phase.

It is desirable that the general airport image to be inset into the background display have sufficient resolution, but it would be extremely expensive to provide equal resolution in the entire 180° background display, and accordingly the invention includes an arrangement which provides a pseudoresolution in the background display, to allow the background display to cover a large area with a limited number of scan lines, without discernible gaps between adjacent scan lines. Background image generator 7 scans its pair of transparencies with three simultaneously progressing sectors, in a sequence of upward scans which is illustrated in FIG. 13b. Numerals at the upper edge of the sectors indicate the sequence of successive scan lines. The background image generator FSS is triggered 36,000 times per second, to provide successive scan lines each 27.77 microseconds long, or 600 times during each field of one-sixtieth of a second. It will be seen that the first scan line is along the left edge of the left sector, the second scan line is along the left edge of the center sector, the third scan line along the left edge of the right sector, the fourth scan line is alongside and slightly to the right of the first scan line, and so forth, ending with the 598th scan during a given field, along the right edge of the left sector, the 599th along the right edge of the central sector, and the 600th scan of the field along the right edge of the right sector. Such a sequence is repeated 60 times per second to provide 60 fields per second, which are interlace 2:1 to provide 30 frames per second. Thus, during each field it will be seen that each of the three sectors of the background transparency will be scanned with 200 scan lines.

The video signals derived by the background image FSS are applied to projectors 1, 2 and 3 in a similar sequence, with the video generated during the first scan line applied to projector 1 to draw an upwardly progressing vertical line as shown in FIG. 13c (designated 1st) at the left edge of the field of projector 1; that generated during the second scan being applied to projector 2 to draw the line labeled 2nd along the left edge of the field of projector 2, etc. However, the video generated by the background image FSS is also applied to a delay means shown (FIG. 15) as comprising two delay lines DL-1 and DL-2, each of which has a delay period (27.77$\mu$ secs.) equal to one vertical scan interval, to provide two further delayed video signals from each background image scan. While the background FSS scans the first scan line, the video generated by the FSS is applied directly (via inset amplifier 15A1) to the intensity grid of projector 1. Next, while the second scan line is being scanned and the FSS video is being applied directly to projector 2, the video previously generated during the first scan line is emerging from delay DL-1 and is applied to projector 1 to provide a second line 1a adjacent the first line in the projector field. When the third scan line is being scanned, the video generated during the first scan line emerges from delay DL-2 and is again applied to projector 1 to provide a third line 1b in the field of projector 1, and simultaneously, the video generated during the second scan line emerges from delay line DL-1 and is used to provide line 2a adjacent to the second line in the projector 2 field. Thus, each line of video information generated by the background FSS is painted three times in three adjacent lines in the field of its respective projector, and hence 1,800 scan lines appear across the 180° screen covered by the three projectors as a result of 600 scans by the FSS of background image generator 7 during one field (one-sixtieth of a second), and 3,600 scan lines are provided during one frame (one-thirtieth of a second).

In FIG. 15 the output signal from the background image generator FSS is shown applied via inset amplifier 15A directly and via cascaded delay lines DL-1 and DL-2 to electronic sampling switching means ESS which is shown as comprising simple mechanical switches for ease of illustration. The electronic switching means comprises three three-pole switching means which are cycled at the line sync frequency of 36 kc. The switching means is shown in a condition where the background FSS video being generated is being applied directly by the upper section of the switch to projector 1, the video emerging from delay DL-1 which was generated during the preceding scan is being applied to projector 2, and the video emerging from delay DL-2 which was generated during the second preceding scan is being applied to projector 3. After each scan line interval, the switching means is advanced one stop in a counterclockwise manner as shown in FIG. 15.

The background video signals applied to the projectors are each applied through a respective video inset amplifier 15A1, 15A2 and 15A3. Video signals from the airport lighting image generator 6 are also supplied to each of the amplifiers 15A1, 15A2 and 15A3. A respective one of the amplifiers 15A1, 15A2 and 15A3 also receives (when a general airport image is to be inset into its respective projector field) a video signal from the airport image generator 8, which is routed by switching logic circuit 91. The logic circuit 91 includes electronic switching means shown in FIG. 15 as comprising three electronic switches VP-1 to VP-3, which are selectively controlled by the output of AND circuits 457—459 in a manner to be described below. For example, when the inset video generated by the inset FSS during a given scan is to be inset into the raster of projector 1, AND gate 457 will close switch VP-1 for the duration (27μ sec.) of that scan line interval. The time within that scan line interval during which video signals will be produced by the inset FSS will depend, of course, upon the position of the FSS raster relative to the center of the picture being scanned which is controlled by raster position computer 99 (FIG. 16) in accordance with simulated pitch angle, and upon the amplitude of the FSS vertical scan, which varies as a function of instantaneous range R in view of the operation of multiplier 105 (FIG. 7) as described above.

As mentioned above, all three projectors are triggered simultaneously at a sweep repetition rate of 36 kc., to provide 60 600-line fields per second, interlaced two-to-one to provide 30 1,200-line frames per second, and switching logic circuit 91 both determines at any instant which pair of projector sweep waveforms are processed to control the image inset FSS and operates to apply the image inset FSS video to the selected projector. The matter of which single projector or which pair of projectors will project all or a part of the general airport image to be inset into the background display will be seen to depend both upon the size of the image to be inset and the simulated heading ψ of the aircraft, as mentioned above in connection with FIGS. 11 and 16. Assume a 180° screen, with each projector covering 60° width, and with each projector utilizing 600 vertical scan lines per field (i.e., 10 lines per degree of its respective sector of screen width). If an inset having a width of one line were to be inset into the field of central projector 2, it will be apparent that the projector 2 sweep waveform should be chosen by switching logic circuit 91 at field line number (300+10ψ) of projector 2, where ψ is the heading angle in degrees measured from the center of the central sector of the field of projector 2. If such a one-line inset is to represent the picture content of the exact center (measured horizontally) of the picture, it will be apparent that the origin of the FSS raster should be located over the photograph so that field line number (300+10ψ) results in a vertical scan through the exact center of the picture, and hence in a requirement that the FSS raster origin be positioned relative to the picture as a function of simulated heading. If the inset instead is to have a line width of W vertical scan lines, it will be seen that the projector 1 waveform should be connected to control the FSS beginning at line number (300+10ψ−W/2) and then later disconnected at line number (300+10ψ+W/2). The beginning and ending line numbers at which the different projector sweep waveforms should be selected by switching logic circuit 91 during the general airport image phase may be tabulated as follows:

| | Beginning line number | Terminating line number |
|---|---|---|
| Projector: | | |
| 1 | $L_{LS}=300+10(\psi+60)-W/2$ | $L_{LE}=300+10(\psi+60)+W/2$ |
| 2 | $L_{CS}=300+10\psi-W/2$ | $L_{CE}=300+10\psi+W/2$ |
| 3 | $L_{RS}=300+10(\psi-60)-W/2$ | $L_{RE}=300+10(\psi-60)+W/2$ |

For each of the above expressions the line numbers must lie between zero and 600, of course. The width of any general airport image to be inset will be recognized to vary inversely with simulated range R from the simulated airport.

In FIG. 13a image I-1 has a width of 10° (100 lines) and is assumed to occur with a simulated relative heading of −15°. The quantity $L_{CS}$ will be seen to equal 100 and the quantity $L_{CE}$ to equal 200, indicating that the video will be inset into the field of central projector 2 during scan lines 100 to 200 of the 600-line raster. Furthermore, it will be seen that the middle line video of the picture will be applied to projector 2 during scan line 150. Under such conditions the quantities $L_{LS}$ and $L_{LE}$ both will be greater than 600, and the quantities $L_{RS}$ and $L_{RE}$ both will be negative, which will result in the sweep waveforms of the left and right projectors never being selected by logic circuit 91, and in no airport image video being applied to these two projectors, in a manner to be described below.

Now assume instead that simulated heading changes to −28° (without a change in range), so that the image illustrated at I-2 in FIG. 13a is required. It may be determined from the above table that under such conditions a 30-line portion of the 100 lines wide image I-2 must be inset into the right-hand edge of the left side projector 1, and that a 70-line portion must be inset into the left-hand side of the field of central projector 2. The line start and line end numbers calculated in accordance with the table above then will be as follows:

$$L_{LS}=570 \quad L_{LE}=670$$
$$L_{CS}=30 \quad L_{CE}=70$$
$$L_{RS}=630 \quad L_{RE}=530$$

Exemplary apparatus which solves the six tabulated expressions is shown in FIG. 13. The six expressions may be solved by either digital or analog, or combined digital-analog apparatus, and the precise arrangement shown is merely exemplary. Inset line width computer IWC, which may comprise a simple divider circuit, receives an input signal commensurate with simulated range R from the airport from computer 200 (FIG. 12) and provides positive and negative output signals each commensurate with half of the line width of the general airport image to be inset. Heading summer circuit HS receives an input signal commensurate with instantaneous simulated heading and provides three output signals commensurate with the central line of the inset for each projector which such an instantaneous heading should provide. The half-line-width and central line quantities are summed, together with a bias quantity equal to 300 lines, in accordance with the six expressions in six respective summing and comparison circuits 451—456, each of which also receives the output signal from line counter 100.

Assuming that simulated range requires a 100-lines wide inset and that heading is −28° as in the above example, when the line counter is at its zero count condition, because zero is greater than −30, the $L_{CS}$ quantity computed by summing comparator 453, and less than +70, the $L_{CE}$ output quantity computed by comparator 454, a logic "1" output signal will be provided from AND gate circuit 458 which will cause the projector 2 waveforms to be selected by closure of electronic switches SP2 and the generated video to be routed to projector 2. When the line count reaches +70, however, after 70 vertical lines have been scanned, the switching of comparator 454 will disable gate 458, open switches SP2 and disconnect the projector 2 waveforms. None of the projector waveforms then will be selected for a number of vertical scans, and no airport image video will be routed to any of the projectors, until the line count reaches 570. As the line count exceeds the $L_{LS}$ quantity (570) applied to comparator 451, but remains less than the $L_{LE}$ quantity (670) applied to comparator 452, a logic "1" output signal from gate 457 will close switches SP1 to cause the left side projector 1 waveforms to be selected to drive the FSS and cause the generated video to be applied to projector 1, and that condition will prevail until a field line count of 600 is reached, at which time all of comparators 451-456 are reset to their initial conditions, and the cycle will be repeated. Because the line count is always greater than −530 in the example, the $L_{RE}$ quantity computed in comparison circuit 456, gate 459 will never be enabled in the above example, and hence the projector 3 waveforms never will be applied on lines 94 and 95 to control the FSS and no airport image video will ever be applied to projector 3. Operation to similarly select between the projector waveform pairs under other heading and range conditions now will be apparent without further explanation.

If 100 vertical scan lines provide the entire image as in the above example, 500 of the total of 600 FSS scan lines will, of course, be blanked out, 70/600 or 11.3 percent of the scan lines will generate the right-hand 70 percent of the inset, and 30/600 or 5 percent of the scan lines will generate the left-hand 30 percent of the inset. In order for the first scan line to generate the picture content 30 percent of the way across the picture, and for the 70th scan line to generate the right-hand edge of the picture, it can be deduced that the origin of the FSS raster should be located rightwardly from the center of the picture by an amount corresponding to 280 lines, which at 10 lines per degree, will be seen to correspond to the heading (−28°) assumed in the example. Similarly, in order for the 570th scan line across the picture to generate the left-hand edge of the picture and for the 600th scan line to generate the picture content almost 30 percent of the distance across the picture, it can be deduced that the origin of the FSS raster should be located leftwardly from the center of the picture by an amount corresponding to 320 lines, or 32° in terms of display width, 32° being the sum of the assumed −28° heading and the 60° angular difference between the reference heading direction and the center of the 60° field of projector 1. It similarly may be deduced that the FSS origin should be shifted ($\psi$−60°) from the center of the picture when heading and picture width result in the display of an image on projector 3.

In order to derive signals to apply to the raster position computer to effect such positioning of the FSS raster relative to the picture being scanned, the output signals from heading summer HS in FIG. 13 are gated by output signals from AND gates 457—459 through switches shown as AND gates 463—465. Whenever AND gate 458 provides a logic output signal to select the central projector 2 sweep waveforms to drive the FSS (by closure of switch SP2 in FIG. 13) and to apply the generated video to projector 2 (by operation of switch VP-2 in FIG. 15), the logic output signal also operates AND gate 464 to apply the $\psi$ heading signal from heading summer HS to raster position computer 99 (FIG. 16), and when projector 1 or projector 3 is instead selected, an output from gate 457 or 459 operates gate 463 or 465 to apply a ($\psi$+60°) or ($\psi$−60°) quantity to the raster position computer.

During the approach phase, when the generated airport display is provided solely on central projector 2, operation of relay P2 provides a continuous potential which is applied to gate 464 in FIG. 13 to continuously apply the heading quantity $\psi$ to the raster position computer via scaling resistor R-131, and during the taxi phase operation of relay P3 closes gate 464 and applies the heading quantity to the position computer 99 through a different scaling resistor R-132. The horizontal and vertical waveforms selected by the switching circuit 91 apparatus of FIG. 13 are applied to distortion computer 96 on lines 94 and 95 as described above.

As well as determining which projector waveforms are used to drive the inset FSS during the general airport image phase, switching logic circuit 91 determines which projector displays the FSS video output signal and which projectors display background video signals generated by background image generator 7. The output signals of AND circuits 457—459 control electronic switches VP-1 to VP-3 in FIG. 15 to perform that function in a manner to be described below.

During the approach phase, the FSS-generated video is inset solely into the field of central projector 2, as mentioned above. Energization of relay P2 during that phase (see FIG. 12) applies a positive signal via OR gate 131 and relay SSR to switch SP-2 in FIG. 13 to hold that switching circuit closed during that phase, and applies negative signals to switches SP-1 and SP-3 to hold them open, thereby continuously applying the central projector waveforms to drive the FSS sweep circuits. Energization of relay P2 also will be seen in FIG. 15 to bypass electronic switches VP-1 to VP-3, so that the amplified airport image video is always applied to central projector 2. The line-start and line-stop numbers at which the image inset into projector 2 begins and ends are computed in FIG. 13 and comparators 453 and 454 operate in a manner generally similar to their operation during the general airport image phase, thereby shifting the centrally inset image in accordance with heading. Because the pictures of the approach portion of the filmstrip are taken at successive distances from the airport, the size of the area inset into the central projector field does not vary with range, and accordingly a constant signal is applied to computer IWC of FIG. 13 during the approach phase in lieu of the range signal, by operation of relay P2.

During the taxi phase of the mission when a panoramic strip transparency is being scanned, a portion of the transparency covering a 180° view is preferably scanned, and the generated video is applied to all three projectors, preferably using the pseudoresolution technique described above in connection with the background generator. As shown in FIG. 15, operation of relay P3 during the taxi phase disconnects the background image generator video from amplifier 15A and substitutes therefor the amplified airport image video. During the first vertical scan along the left edge of the left-hand third of the 180° portion of the strip being scanned, the FSS airport video is applied to projector 1, and during the next two vertical scans the same video information emerges from delay lines DL-1 and DL-2 and is applied again to two adjacent lines near the left side of the field of projector 1. The second scan progresses along the left edge of the middle third of the 180° portion, and the third scan along the left edge of the right-hand third of the 180° portion of the panoramic strip being scanned. During this phase of the mission, the generated airport image video fills all of the screen, and no background video need be generated. Accordingly, the three projector sweep rates are not varied by information from the background generator elevation transparency, and all three projectors sweep in synchronism, so that a single pair of the projector waveforms may be selected to derive the airport image FSS sweep waveforms, although the three pairs of projector waveforms could be used successively, if desired. In FIG. 13 energization of relay P3 is shown operative to energize relay SRR through OR gate 131 so that the central projector 2 pair of waveforms are connected to lines 94 and 95 and used to derive the airport image FSS sweep waveforms.

In order that the FSS sweep the 180° portion of the panoramic strip in three simultaneously progressing sections as mentioned, three different signals are successively and repetitively added to the projector 2 horizontal sweep waveform in order to derive the FSS horizontal sweep waveform, in a manner illustrated in FIG. 16. During the first scan, the addition of a constant negative signal to the horizontal sweep waveform horizontally positions the first scan line to the left to a position along the left edge of the left-hand third of the 180° portion of the panoramic strip being scanned. During the second scan a zero-volt signal is applied, and during the third scan a positive signal horizontally positions the third scan line to the right to a position along the left edge of the right-hand third of the 180° portion of the transparency being scanned. The positive and negative signals are each equal in magnitude to the amplitude of the horizontal sweep waveform, and hence each equal to a deflection voltage commensurate with one-third of the portion of the panoramic strip being scanned. As the horizontal sweep waveform increases during the 200 vertical scans across each third of the 180° portion, each successive vertical scan will be seen to progress rightwardly. In FIG. 16 the energization of relay P3 will be seen to connect the projector 2 vertical waveform to counter 801, which has three states. During the first state of counter 801, line 802 operates AND gate 803 to add a negative signal to amplifier 16A2, during the second state, line 804 operates AND gate 805 to ground line 806, and during the third state, line 807 operates AND gate 808 to apply a positive signal to amplifier 16A2. The video inset amplifiers 15A1—15A3 shown in FIG. 15 each comprise a known form of "priority" type amplifier commonly used to inset video information in commercial television broadcasting. During the general airport image phase, video signals applied to these amplifiers from the background image generator (via amplifier 15A and switches ESS) are displayed at all times that airport image video is not being applied. The application of airport image video to any one of the three amplifiers operates to bar passage of the background video through the amplifier so that only the airport image video passes through the amplifier to its associated projector.

In FIG. 15 a mechanical input is shown being applied to rotate each of the projector deflection coils in accordance with simulated bank angle Φ. Well-known alternative forms of raster rotation using either mechanically rotatable or electronic resolvers obviously may be substituted without departing from the invention.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawings shall be interpreted as illustrative and not in a limiting sense.

What I claim is:

1. Visual display apparatus for providing a display of an area to an operator of a vehicle simulator, comprising (1) means responsive to controls of said simulator for providing a plurality of computed quantities; (2) a plurality of pictures of said area each representing a view of said area from the same distance from a reference point associated with said area but each a view from a position having a different angular orientation from said reference point; (3) control means responsive to said computed quantities for selecting at a given instant a single one of said pictures in accordance with the instantaneous simulated azimuth and elevation angles of a simulated vehicle relative to a simulated reference point; (4) projection means for projecting an image of the selected one of said pictures to be viewed by said operator; and (5) means responsive to said computed quantities for varying the size of the projected image inversely in accordance with the instantaneous simulated distance of said simulated vehicle from said simulated reference point.

2. Visual display apparatus as defined in claim 1 including means responsive to said computed quantities for distorting said projected image in accordance with the difference between the angular orientation of said selected one of said pictures and one of said simulated angles.

3. Visual display apparatus as defined in claim 1 in which said projection means includes scanning means for viewing said selected one of said pictures, in which said plurality of pictures are arranged in groups, each of said groups comprising pictures all taken from the same azimuth angle from said reference point at different elevation angles from said reference point, and in which said control means is operative to position a selected group of said pictures relative to said scanning means in accordance with the instantaneous simulated azimuth of said simulated vehicle and operative to control said scanning means to view said selected one of said pictures from said selected group in accordance with the instantaneous simulated elevation angle of said simulated vehicle.

4. Visual display apparatus as defined in claim 1 in which said plurality of pictures comprises a strip of transparent film having a plurality of successive frames, each of said frames comprising rows and columns of said pictures, each of the pictures of a given frame representing a view of said area from a common one of said angles from said reference point.

5. Visual display apparatus as defined in claim 1 in which said projection means includes means for projecting a background scene to be viewed by said operator and in which said projection means is operative to inset said projected replica into said background scene.

6. Visual display apparatus as defined in claim 5 in which said projection means includes further means responsive to at least one of said computed quantities commensurate with a simulated attitude angle of said simulated vehicle for controlling the position at which said projected image is inset into said background scene.

7. Visual display apparatus as defined in claim 5 in which said projection means comprises further means for translating said projected image to a position within said background scene in accordance with simulated pitch angle of said simulated vehicle.

8. Visual display apparatus as defined in claim 5 in which said projection means comprises further means for angularly rotating said projected image to a position within said background scene in accordance with simulated bank angle of said simulated vehicle.

9. Visual display apparatus as defined in claim 1 in which said projection means comprises flying spot scanner means for scanning the selected one of said pictures with a controlled pattern to derive video signals, and television projector means responsive to said video signals for projecting said image to be viewed by said operator.

10. Visual display apparatus as defined in claim 9 in which said means for varying the size of said projected image comprises means for controlling the scanning pattern of said flying spot scanner means.

11. Visual display apparatus as defined in claim 9 in which said television projector means comprises a plurality of television projectors each having first and second sweep circuits and each having an intensity control means, and in which said apparatus includes means responsive to one of said computed quantities commensurate with a simulated attitude angle of said simulated vehicle for selectively applying signals from the sweep circuits of one of said television projectors to control said scanning pattern of said flying spot scanner and for selectively applying said video signals to the intensity control means of said one of said television projectors.

12. Visual display apparatus as defined in claim 9 in which said television projector means includes raster scanning means, said apparatus further including means for angularly rotating said raster scanning means in accordance with an attitude angle of said simulated vehicle.

13. Visual display apparatus as defined in claim 1 in which said projection means includes a first flying spot scanner means for deriving a first video signal representing a background scene; a second flying spot scanner means for scanning the selected one of said pictures; and television projector means responsive to said first and second video signals for projecting a background scene with said image inset into said background scene.

14. Visual display apparatus as defined in claim 13 in which said television projector means includes a plurality of television projectors, and in which said first flying spot scanner means includes delay means for applying respective portions of said first video signal repeatedly to respective one of said television projectors.

15. Visual display apparatus for providing a display of an area to an operator of a vehicle simulator, comprising (1) means responsive to controls of said simulator for providing a plurality of computed quantities; (2) a plurality of groups of pictures of said area, each picture of a given group representing a view of said area from the same distance away from a reference point associated with said area, each different group of pictures representing views of said area from positions at different respective distances from said reference point, and each picture of a given group representing a view from a position having a different angular orientation from said reference point than other pictures of the same group; (3) control means responsive to certain of said computed quantities for selecting at a given instant a single one of said pictures in accordance with the instantaneous simulated azimuth and elevation angles of a simulated vehicle relative to a simulated reference point; (4) first flying spot scanner means for deriving a first video signal representing a background scene; (5) second flying spot scanner means for scanning the selected one of said pictures to provide a second video signal; (6) and projection means responsive to said first and second video signals for providing a background scene with an image of said pictures inset into said background scene.

16. Visual display apparatus as defined in claim 15 in which each picture of a given group represents a view having a different combination of azimuth and elevation angles than other pictures of the same group, a first plurality of sets of said pictures representing views having the same respective azimuth angle from said reference point, and a second plurality of sets of said pictures representing views having the same respective elevation angle from said reference point.

17. Visual display apparatus as defined in claim 15 in which said plurality of groups of pictures comprises a transparent filmstrip having successive frames, each of said frames comprising one of said groups of said pictures.

18. Visual display apparatus as defined in claim 15 including means responsive to computed quantities commensurate with simulated deviation of said simulated vehicle from a simulated reference line for varying the operation of said flying spot scanner means to vary the apparent perspective of said image inset into said background scene.

19. Visual display apparatus as defined in claim 15 in which said projection means includes means responsive to a further of said computed quantities commensurate with a simulated attitude angle of said simulated vehicle for controlling the position at which said projected image is inset into said background scene.

20. Visual display apparatus as defined in claim 15 in which said projection means comprises a raster scanning television projector means, and in which said apparatus includes means for angularly rotating the raster of said television projector means in accordance with an attitude angle of said simulated vehicle.

21. Visual display apparatus for providing a display of an area to an operator of a vehicle simulator, comprising (1) means responsive to controls of said simulator for providing a plurality of computed quantities; (2) a plurality of groups of pictures of said area, the pictures of a given group representing views of said area from positions the same distance away from a reference point associated with said area at different respective azimuth angles from said reference point and all at the same elevation angle from said reference point; (3) control means responsive to certain of said computed quantities for selecting at a given instant a single one of said pictures in accordance with the simulated distance and azimuth angle of said simulated vehicle from a simulated reference point; (4) flying spot scanner means for scanning a selected portion of said selected one of said pictures to derive a video signal; (5) television projector means responsive to said video signal for projecting an image of said selected portion of said selected one of said pictures; and (6) means controlled in accordance with the simulated heading of said simulated vehicle for controlling said flying spot scanner means to select the portion of said selected one of said pictures being scanned by said scanner means.

22. Visual display apparatus as defined in claim 21 further comprising means responsive to the azimuthal position of said simulated vehicle from said simulated reference point for varying the scanning pattern of said scanner means on said selected one of said pictures to vary the perspective of said display.

23. Visual display apparatus for providing a display of an area to an operator of a vehicle simulator, comprising (1) means responsive to controls of said simulator for providing a plurality of computed quantities; (2) a motion-picture filmstrip having a plurality of successive sections, each section comprising a plurality of successive frames, each successive frame comprising a plurality of pictures of said area; (3) flying spot scanner means for scanning selected successive portions of said successive frames to provide video signals; (4) television projector means responsive to said video signals for providing a display to be viewed by said operator; (5) filmfeed means responsive to certain of said computed quantities for positioning successive sections of said filmstrip before said flying spot scanner means and for positioning successive frames of said filmstrip sections before said flying spot scanner; and (6) means responsive to certain of said computed quantities for controlling said flying spot scanner to scan a single one of the plurality of pictures of a frame positioned before said scanner at a given instant.

24. Visual display apparatus as defined in claim 23 in which all of the frames of one of said sections of said filmstrip represent views of said area from positions which are equidistant from a reference point associated with said area.

25. Visual display apparatus as defined in claim 23 further comprising means for deriving further video signals representing a background area, and means for applying said further video signals to said television projector means.

26. Visual display apparatus as defined in claim 23 in which said filmstrip includes successive indicia coded adjacent various of said frames along the length of said filmstrip, in which said apparatus includes means for sensing said indicia to provide a first signal, in which said film feed comprises servomechanism means responsive to a computed quantity commensurate with simulated distance of said simulated vehicle from a reference point associated with said area and responsive to said first signal.

27. Visual display apparatus for providing a composite display of an area to an operator of a vehicle simulator, comprising (1) means responsive to controls of said simulator for providing a plurality of computed quantities; (2) a plurality of television projectors, each of said projectors having sweep generator means and the projectors being arranged to provide respective adjacent portions of the composite display; (3) flying spot scanner means for scanning a picture to provide a video signal representing a picture replica to be inset into the display; (4) first switching means for selectively connecting signals at different times from different ones of said sweep generator means to control said flying spot scanner means; (5) second switching means for selectively applying said video signal at different times to different ones of said television projectors; and (6) means responsive to certain of said computed quantities for controlling the operation of said switching means.

28. Visual display apparatus as defined in claim 27 wherein the sweep generator means of said projectors are connected to be triggered in synchronism with each other; said apparatus including counter means for counting successive scan lines of said projectors; and wherein said means for controlling said switching means comprises means for computing a first quantity commensurate with the line width of the picture replica to be inset into the composite display, means for computing a second quantity commensurate with the desired location of a reference portion of said picture replica within said composite display, means for combining said first and second quantities to provide line-starting and line-stopping quantities for each of said projectors; and comparator means for comparing said line-starting and line-stopping quantities with the count in said counter means to selectively operate said switching means.

29. Visual display apparatus as defined in claim 27 wherein said means for computing said first quantity is responsive to a computed quantity commensurate with simulated distance of said simulated vehicle from a reference point associated with said area.

30. Visual display apparatus as defined in claim 27 wherein said means for computing said second quantity is responsive to a computed quantity commensurate with simulated heading of said simulated vehicle.

31. A method of simulating from a pair of objects the appearance of an area as viewed from one of a plurality of selected viewpoints, which objects each have the appearance of said area as viewed from a respective reference viewpoint, with the range of each reference viewpoint from said area being approximately equal to one another and each reference viewpoint having a different angular orientation with respect to said area, comprising the steps of selecting one of said objects in accordance with the angular orientation of one selected viewpoint with respect to said area, projecting an image of the selected object onto a viewing surface, and distorting said image in accordance with the difference between the angular orientation of said one selected viewpoint and the angular orientation of the appearance of said area on said selected object with respect to said area.

32. A method of simulating the appearance of an area as defined in claim 31 further comprising the step of distorting said image in accordance with the difference between the range of said one selected viewpoint from said area and the range of the reference viewpoint of said selected object from said area.

33. Apparatus for simulating from a pair of objects the appearance of an area as viewed from one of a plurality of selected viewpoints, which objects each have the appearance of said area as viewed from a reference viewpoint, with the range of each reference viewpoint being approximately equal to one another and each reference viewpoint having a different angular orientation with respect to said area, comprising means for selecting one of said objects in accordance with the angular orientation of one selected viewpoint with respect to said area, means for projecting an image of the selected object onto a viewing surface, and means for distorting said image in accordance with the difference between the angular orientation of said one selected viewpoint and the angular orientation of the appearance of said area of said selected object with respect to said area.

34. Apparatus as defined in claim 33 further comprising means for distorting said image in accordance with the difference between the range of said one selected viewpoint from said area and the range of the reference viewpoint of said selected object from said area.

35. Visual display apparatus for providing a display of an area to an operator of a vehicle simulator, comprising means responsive to controls of said simulator for providing the plurality of computed quantities; a plurality of pictures of said area each representing a view of said area from the same distance from a reference point associated with said area, but each a view from a position having a different angular orientation from said reference point; control means responsive to certain of said computed quantities for selecting at a given instant a single one of said pictures in accordance with the instantaneous simulated azimuth and elevation angles of a simulated vehicle relative to a simulated reference point; and projection means for projecting an image of the selected one of said pictures to be viewed by said operator.

36. Visual display apparatus as defined in claim 35, further comprising means for altering the apparent prospective of the projected image of the selected one of said pictures in accordance with the difference between the simulated angular orientation of said simulated vehicle from said simulated reference point and the angular orientation of the projected image of the selected one of said pictures with respect to said reference point.

37. Visual display apparatus as defined in the claim 36 further comprising a means responsive to a further one of said computed quantities for varying the size of the projected image inversely in accordance with the instantaneous simulated distance of said simulated vehicle from said simulated reference point.

38. Visual display apparatus as defined in claim 35 wherein said projection means includes a plurality of television projectors, each of said projectors having sweep generator means and the projectors being arranged to provide respective adjacent portions of the display, and flying spot scanner means for scanning the selected one of said pictures to provide a video signal representing a picture replica to be inset into the display; said apparatus further comprising first switching means for selectively connecting signals at different times from different ones of said sweep generator means to control said flying spot scanner means; second switching means for selectively applying said video signal at different times to different ones of said television projectors; and means responsive to certain of said computed quantities for controlling the operation of said switching means.

39. Visual display apparatus as defined in claim 38 in which the sweep generator means of said projectors are connected to be triggered in synchronism with each other; said apparatus including counter means for counting successive scan lines of said projectors; and wherein said means for controlling said switching means comprises means for computing a first quantity commensurate with the line width of the picture replica to be inset into the display, means for computing a second quantity commensurate with the desired location of a reference portion of said picture replica within said display, means for combining said first and second quantities to provide line-starting and line-stopping quantities for each of said projectors, and comparator means for comparing said line-starting and line-stopping quantities with the count in said counter means to selectively operate said switching means.

40. Visual display apparatus as defined in claim 38 wherein said means for computing said first quantity is responsive to a computed quantity commensurate with simulated distance of said simulated vehicle from a reference point associated with said area.

41. Visual display apparatus as defined in claim 38 wherein said means for computing said second quantity is responsive to a computed quantity commensurate with a simulated heading of said simulated vehicle.

42. A visual display apparatus as defined in claim 35 wherein said projection means includes means for scanning the selected one of said pictures, means for sensing the scanning position of said scanning means and generating positional signals corresponding thereto, means for generating sweep signals for said scanning means, and means for sensing the difference between said sweep signals and said positional signals and being coupled to said sweep generating means to correct the position of said scanning means with respect to the selected picture.

43. In a visual display apparatus for providing a display of an area by projecting an image from a filmstrip to the operator of a vehicle simulator, the improvement comprising a filmstrip having a plurality of pictures of said area each representing a view of said area from the same distance from a reference point associated with said area but each a view from a position having a different angular orientation from said reference point, and means responsive to the operation of controls of said simulator by the operator for selecting any one of said pictures and for projection of an image thereof to the operator.

44. A visual display apparatus as defined in claim 43 wherein said means selects a single one of said pictures in accordance with the instantaneous simulated azimuth and elevation angles of a simulated vehicle relative to a simulated reference point.

45. In a visual display apparatus for providing a display of an area by projecting an image from a filmstrip to the operator of a vehicle simulator, the improvement comprising a plurality of groups of pictures of said area, each picture of a given group representing a view of said area from the same distance away from a reference point associated with said area, each different group of pictures representing views of said area from positions at different respective distances from said reference point, and each picture of a given group representing a view from a position having a different angular orientation from said reference point than other pictures of the same group, and means responsive to the operation of controls of said simulator by the operator selecting any one of said pictures and for projection of an image thereof to the operator.

46. A visual display apparatus as defined in claim 45 wherein said means selects a single one of said pictures in accordance with the instantaneous simulated azimuth and elevation angles of a simulated vehicle relative to a simulated reference point.